United States Patent
Ko et al.

(10) Patent No.: US 9,635,687 B2
(45) Date of Patent: Apr. 25, 2017

(54) METHOD FOR TRANSMITTING AND RECEIVING FRAME IN WIRELESS LOCAL AREA NETWORK SYSTEM AND APPARATUS FOR THE SAME

(71) Applicant: ELECTRONICS & TELECOMMUNICATIONS RESEARCH INSTITUTE, Daejeon (KR)

(72) Inventors: Gwang Zeen Ko, Daejeon (KR); Hyun Duk Kang, Gwangju (KR); Igor Kim, Daejeon (KR); Myung Sun Song, Daejeon (KR); Jin Hyung Oh, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 206 days.

(21) Appl. No.: 14/547,618

(22) Filed: Nov. 19, 2014

(65) Prior Publication Data

US 2015/0139201 A1 May 21, 2015

(30) Foreign Application Priority Data

Nov. 20, 2013 (KR) .................. 10-2013-0141271
Nov. 19, 2014 (KR) .................. 10-2014-0161432

(51) Int. Cl.
*H04W 74/08* (2009.01)
*H04W 84/12* (2009.01)
*H04W 72/08* (2009.01)

(52) U.S. Cl.
CPC ...... *H04W 74/0816* (2013.01); *H04W 72/082* (2013.01); *H04W 84/12* (2013.01)

(58) Field of Classification Search
CPC ..... H04W 80/04; H04W 84/18; H04W 84/12; H04W 72/082; H04W 74/0816
See application file for complete search history.

(56) References Cited

U.S. PATENT DOCUMENTS 7,751,443 B2 * 7/2010 Shah .................. H04L 49/25
370/389
8,279,795 B2  10/2012 Lee et al.
(Continued)

OTHER PUBLICATIONS

Dr. Amir Qayyum, et al; "Performance increase in CSMA/CA with RTS-CTS", Published in Multi Topic Conference, 2003. INMIC 2003. 7th International; Date of Conference: Dec. 9, 2003; pp. 182-185.

*Primary Examiner* — Christopher Grey
(74) *Attorney, Agent, or Firm* — Ladas & Parry LLP

(57) ABSTRACT

Disclosed are a method for transmitting and receiving a frame in a wireless local area network (WLAN) system and an apparatus for the same. A method for generating interference/non-interference station lists includes receiving a first frame from a second station, acquiring a receiver address of the first frame from the first frame, and setting, based on whether to receive a second frame that is a response to the first frame from a third station indicated by the receiver address within a preset time from a time when the first frame has been received, the third station as an interference station or a non-interference station. Therefore, the performance of a communication system may be improved.

20 Claims, 17 Drawing Sheets

(56) References Cited

U.S. PATENT DOCUMENTS

| | | | |
|---|---|---|---|
| 8,289,849 B2 | 10/2012 | Ribeiro et al. | |
| 8,724,651 B2* | 5/2014 | Yomo | H04W 74/0808 |
| | | | 370/332 |
| 8,787,328 B2* | 7/2014 | Kang | H04W 74/0825 |
| | | | 370/337 |
| 8,848,730 B1* | 9/2014 | Vleugels | H04W 8/005 |
| | | | 370/304 |
| 8,908,707 B2* | 12/2014 | Wermuth | H04W 72/082 |
| | | | 370/406 |
| 8,953,498 B2* | 2/2015 | Kim | H04W 48/16 |
| | | | 370/255 |
| 2010/0074198 A1* | 3/2010 | Morioka | H04L 12/413 |
| | | | 370/329 |
| 2011/0305148 A1 | 12/2011 | Kim et al. | |
| 2013/0005269 A1* | 1/2013 | Lindoff | H04J 11/0026 |
| | | | 455/63.1 |
| 2014/0112175 A1* | 4/2014 | Pantelidou | H04W 28/26 |
| | | | 370/252 |

* cited by examiner

METHOD FOR TRANSMITTING AND RECEIVING FRAME IN WIRELESS LOCAL AREA NETWORK SYSTEM AND APPARATUS FOR THE SAME

CLAIM FOR PRIORITY

This application claims priority to Korean Patent Application No. 10-2013-0141271 filed on Nov. 20, 2013 and No. 10-2014-0161432 filed on Nov. 19, 2014 in the Korean Intellectual Property Office (KIPO), the entire contents of which are hereby incorporated by reference.

BACKGROUND

1. Technical Field

Example embodiments of the present invention relate in general to technology that transmits and receives a frame in a wireless local area network (WLAN) system and more specifically to technology that transmits and receives a frame in an exposed node state or a blocked node state.

2. Related Art

With the development of information communication technologies, a variety of wireless communication technologies have been developed. Among these technologies, a wireless local area network (WLAN) includes technology that is used to make wireless connection to the Internet possible at homes, businesses, or in specific service providing areas using a portable terminal such as a personal digital assistant (PDA), a laptop computer, a portable multimedia player (PMP), a smart phone, a tablet PC, or the like, based on wireless frequency technologies.

A standard for WLAN technology has been developed as the Institute of Electrical and Electronics Engineers (IEEE) 802.11 standard. WLAN technology according to IEEE 802.11a standard is operated based on an orthogonal frequency division multiplexing (OFDM) method, and may provide a transmission speed of up to 54 Mbps at a 5 GHz band. WLAN technology according to IEEE 802.11b standard is operated based on a direct sequence spread spectrum (DSSS) method and may provide a transmission speed of up to 11 Mbps at a 2.4 GHz band. WLAN technology according to IEEE 802.11g standard is operated based on the OFDM method or the DSSS method, and may provide a transmission speed of up to 54 Mbps at the 2.4 GHz band.

WLAN technology according to IEEE 802.11n standard is operated at the 2.4 GHz band and 5 GHz band based on the OFDM method, and may provide, when using a multiple input multiple output-OFDM (MIMO-OFDM) method, a transmission speed of up to 300 Mbps with respect to four spatial streams. The WLAN technology according to IEEE 802.11n standard may support a channel bandwidth of up to 40 MHz, and in this case, provide a transmission speed of up to 600 Mbps.

As such WLAN technology becomes more prevalent and its applications become more diverse, there is increasing a demand for new WLAN technology that can support a higher processing throughput than a data processing speed supported by IEEE 802.11n. Very high throughput (VHT) WLAN technology is one among IEEE 802.11 WLAN technologies proposed to support a data processing speed of 1 Gbps or higher. Among these, IEEE 802.11ac has been developed as a standard for providing VHT in a band at 5 GHz or less, and IEEE 802.11ad has been developed as a standard for providing VHT in a band at 60 GHz.

In a system based on such WLAN technology, there is a problem that the performance of the WLAN system is degraded due to an exposed node and a blocked node.

SUMMARY

Accordingly, example embodiments of the present invention are provided to substantially obviate one or more problems due to limitations and disadvantages of the related art.

Example embodiments of the present invention provide a method for transmitting and receiving a frame in an exposed node state.

Example embodiments of the present invention also provide a method for transmitting and receiving a frame in a blocked node state.

In some example embodiments, a method for generating interference/non-interference station lists which is performed in a first station, includes: receiving a first frame from a second station; acquiring a receiver address of the first frame from the first frame; and setting, based on whether to receive a second frame that is a response to the first frame from a third station indicated by the receiver address within a preset time from a time when the first frame has been received, the third station as an interference station or a non-interference station.

Here, the setting may include setting the third station as the interference station when normally receiving the second frame from the third station within the preset time.

Also, the setting may include setting the third station as the non-interference station when failing to normally receive the second frame from the third station within the preset time.

Also, the method may further include generating the interference/non-interference station lists including identification information of the third station and reception power information of the second frame measured in the first station.

Also, the first frame may be a probe request frame, an authentication request frame, an association request frame, a reassociation request frame, a request to send (RTS) frame, a data frame, or a block acknowledgement request (BAR) frame.

Also, the preset time may be a short inter-frame space (SIFS).

In other example embodiments, a method for transmitting a frame which is performed in a first station, includes: receiving a first frame from a second station; acquiring a receiver address of the first frame from the first frame; and determining whether a third station indicated by the receiver address is an interference station or a non-interference station based on interference/non-interference station lists generated in advance.

Here, the first frame may be an RTS frame, a data frame, or a BAR frame.

Also, the interference station list of the interference/non-interference station lists may include at least one station that transmits a response to the first frame within a first preset time, and the non-interference station list of the interference/non-interference station lists may include at least one station that fails to transmit the response to the first frame within the first preset time.

Also, the first preset time may be an SIFS.

Also, the method may further include transmitting a third frame after a second preset time from a time when the first frame has been received when the third station is determined as the non-interference station.

Also, the transmitting of the third frame may include acquiring reception power information about a second frame transmitted by the third station from the interference/non-interference station lists, retrieving a channel based on the reception power information during the second preset time, and transmitting the third frame after the second preset time when a signal exceeding a preset signal size does not exist during the second preset time.

Also, the second preset time may be a distributed coordination function (DCF) inter-frame space (DIFS), a point coordination function (PCF) inter-frame space (PIFS), or an arbitration inter-frame space (AIFS).

Also, the third frame may be a frame to request stopping frame transmission to the first station.

Also, the third frame may include at least one of a transmitter address of the third frame, information about a period during which transmission of the frame is stopped, and a receiver address of the third frame.

In still other example embodiments, a first station includes: a processor; and a memory in which at least one program command executed through the processor is stored, wherein the at least one program command is executable to perform steps of: receiving a first frame from a second station; acquiring a receiver address of the first frame from the first frame; and determining a third station indicated by the receiver address as an interference station or a non-interference station based on interference/non-interference station lists generated in advance.

Here, the interference station list of the interference/non-interference station lists may include at least one station that transmits a response to the first frame within a first preset time, and the non-interference station list of the interference/non-interference station lists may include at least one station that fails to transmit the response to the first frame within the first preset time.

Also, the at least one program command may be executable to further perform a step of transmitting a third frame after a second preset time from a time when the first frame has been received, when the third station is determined as the non-interference station.

Also, the transmitting of the third frame may include acquiring reception power information about a second frame transmitted by the third station from the interference/non-interference station lists, retrieving a channel based on the reception power information during the second preset time, and transmitting the third frame after the second preset time when a signal exceeding a preset signal size does not exist during the second preset time.

Also, the third frame may be a frame to request stopping frame transmission to the first station.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
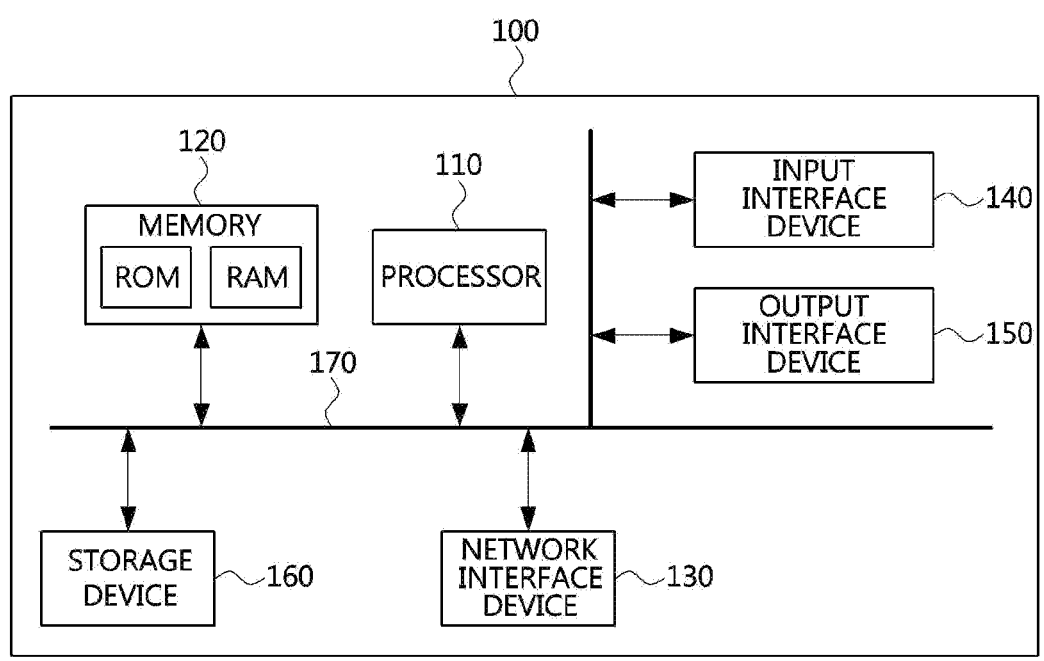
FIG. 1 is a block diagram illustrating an example of a station that performs methods according to an embodiment of the present invention.

Example embodiments of the present invention are disclosed herein. However, specific structural and functional details disclosed herein are merely representative for purposes of describing example embodiments of the present invention, and example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

In the entire specification, a station (STA) is an arbitrary functional medium including a medium access control (MAC) layer defined by the Institute of Electrical and Electronics Engineers (IEEE) 802.11 standard, and a physical layer interface with respect to a wireless medium. STAs may be divided into STAs that are access points (APs) and STAs that are non-APs. An STA that is an AP may be simply referred to as an AP, and an STA that is a non-AP may be simply referred to as a terminal.

The STA may include a processor and a transceiver, and may further include a user interface, a display device, and the like. The processor denotes a unit that is designed to generate a frame to be transmitted through a wireless network or process a frame received through the wireless network, and performs a variety of functions for controlling the STA. The transceiver may be functionally connected to the processor, and is a unit that is designed to transmit and receive a frame through the wireless network for the STA.

The AP may refer to a centralized controller, a base station (BS), a radio access station, a node-B, an evolved node B, a relay, a mobile multihop relay (MMR)-BS, a base transceiver system (BTS), a site controller, or the like, and may include some or all functions thereof.

The terminal (that is, non-AP) may refer to a wireless transmission/reception unit (WTRU), user equipment (UE), a user terminal (UT), an access terminal (AT), a mobile station (MS), a mobile terminal, a subscriber unit, a subscriber station (SS), a wireless device, a mobile subscriber unit, or the like, and may include some or all functions thereof.

Here, the terminal may refer to a desktop computer, a laptop computer, a tablet PC, a wireless phone, a mobile phone, a smart phone, a smart watch, a smart glass, an e-book reader, a portable multimedia player (PMP), a portable gaming device, a navigation device, a digital camera, a digital multimedia broadcasting (DMB) player, a digital audio recorder, a digital audio player, a digital picture recorder, a digital picture player, a digital video recorder, a digital video player, or the like.

FIG. 1 is a block diagram illustrating an example of a station that performs methods according to an embodiment of the present invention.

Referring to FIG. 1, a station 100 may include at least one processor 110, a memory 120, and a network interface device 130 that is connected to a network to perform communication. In addition, the station 100 may further include an input interface device 140, an output interface device 150, a storage device 160, and the like. The respective components included in the station 100 may be connected by a bus 170 to perform communication with each other.

The processor 110 may execute program commands stored in the memory 120 and/or the storage device 160. The processor 110 may include a central processing unit (CPU), a graphics processing unit (GPU), or a dedicated processor in which methods according to the present invention are performed. The memory 120 and the storage device 160 may be constituted of a volatile storage medium and/or nonvolatile storage medium. For example, the memory 120 may be constituted of a read only memory (ROM) and/or a random access memory (RAM).

Embodiments of the present invention may be applied to a wireless local area network (WLAN) system according to IEEE 802.11, and also applied to other communication systems as well as the WLAN system according to IEEE 802.11.

For example, the embodiments of the present invention may be applied to a portable Internet such as a wireless personal area network (WPAN), a wireless body area network (WBAN), a wireless broadband internet (WiBro), or a world interoperability for microwave access (WiMax), a 2G mobile communication network such as a global system for mobile communication (GSM) or a code division multiple access (CDMA), a 3G mobile communication network such as a wideband code division multiple access (WCDMA) or a cdma2000, a 3.5G mobile communication network such as a high speed downlink packet access (HSDPA) or a high speed uplink packet access (HSUPA), a 4G mobile communication network such as a long term evolution (LTE) or LTE-Advanced, a 5G mobile communication network, and the like.

Figure 2:
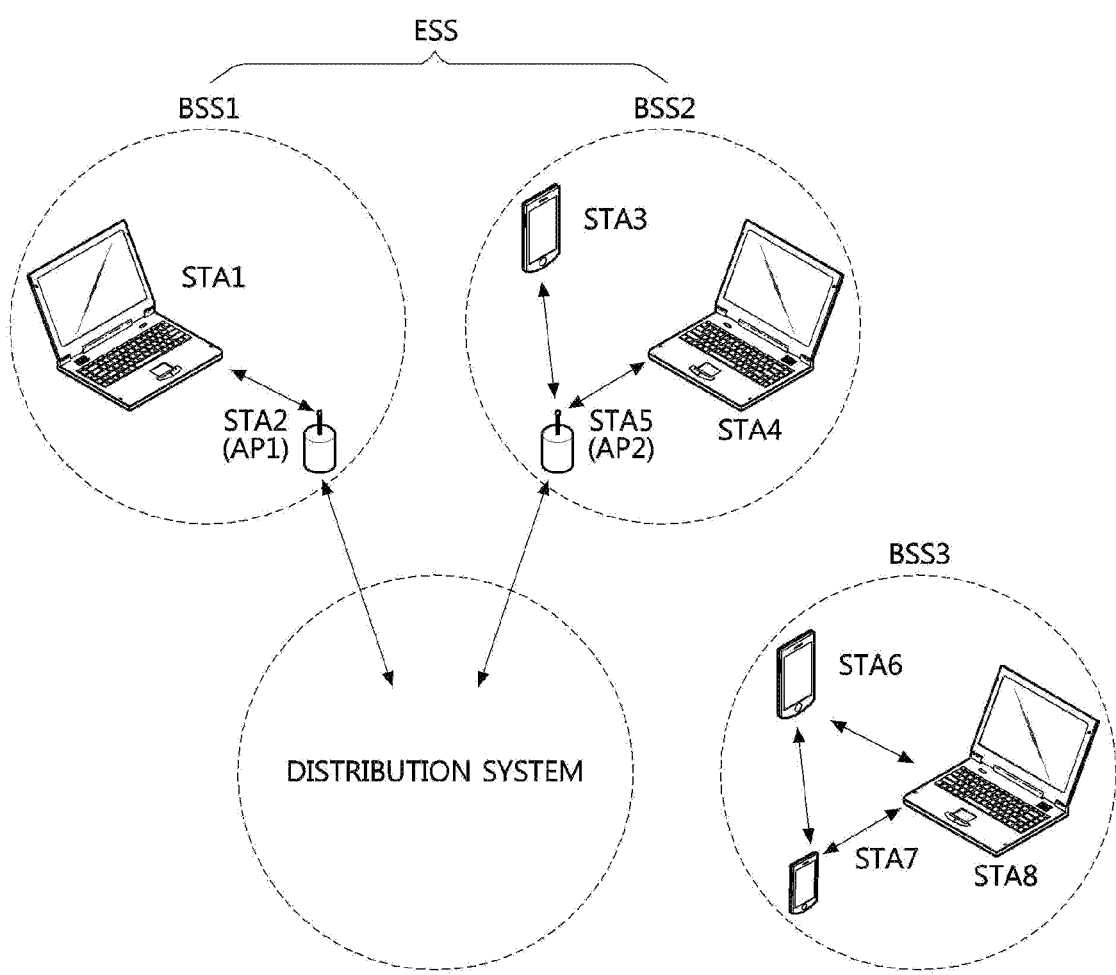
FIG. 2 is a conceptual diagram illustrating an example of a configuration of a wireless local area network (WLAN) system according to the Institute of Electrical and Electronics Engineers (IEEE) 802.11.

FIG. 2 is a conceptual diagram illustrating an example of a configuration of a WLAN system according to IEEE 802.11.

Referring to FIG. 2, the WLAN system according to IEEE 802.11 may include at least one basic service set (BSS). BSS may include a set of stations STA1, STA2 (AP1), STA3, STA4, STA5 (AP2), STA6, STA7, and STA8 in which synchronization is successfully performed to communicate with each other, and is not a concept which means a specific region.

The BSSs may be divided into infrastructure BSSs and independent BSSs (IBSSs). Here, BSS1 and BSS2 mean the infrastructure BSSs, and BSS3 means the IBSS.

The BSS1 may include a first terminal STA1, a first AP (STA2 (AP1)) that provides distribution services, and a distribution system (DS) that associates a large number of APs (STA2 (AP1), STA5 (AP2)). In the BSS1, the first AP (STA2 (AP1)) may manage the first terminal STA1.

The BSS2 may include a third terminal STA3, a fourth terminal STA4, a second AP (STA5 (AP2)) that provides distribution services, and a DS that associates a large number of APs (STA2 (AP1), STA5 (AP2)). In the BSS2, the second AP (STA5 (AP2)) may manage the third terminal STA3 and the fourth terminal STA4.

The BSS3 means an IBSS that is operated in an ad-hoc mode. In the BSS3, an AP that is a centralized management entity performing a management function at the center does not exist. That is, the terminals STA6, STA7, and STA8 are managed in a distributed manner in the BSS3. In the BSS3, all of the terminals STA6, STA7, and STA8 may mean a mobile terminal, and association with the DS is not allowed, and therefore a self-contained network is formed.

The APs (STA2 (AP1), STA5 (AP2)) may provide association with the DS through a wireless medium for the terminals STA1, STA3, and STA4 coupled to the APs (STA2 (AP1), STA5 (AP2)). In the BSS1 or the BSS2, communication among the terminals STA1, STA3, and STA4 is generally performed through the APs (STA2 (AP1), STA5 (AP2)), but in a case in which a direct link is set, direct communication among the terminals STA1, STA3, and STA4 is possible.

A plurality of infrastructure BSSs may be associated with one another through the DS. The plurality of BSSs associated with each other through the DS are referred to as an extended service set (ESS). Objects STA1, STA2 (AP1), STA3, STA4, and STA5 (AP2) included in the ESS may communicate with one another, and arbitrary terminals STA1, STA3, and STA4 within the same ESS may be moved from one BSS to other BSSs while communicating without interruption.

The DS is a mechanism for a single AP to communicate with other APs, and accordingly, the AP may transmit a frame for terminals coupled to the BSS managed by the AP itself, or transmit the frame for an arbitrary terminal moved to the other BSSs. In addition, the AP may transmit and receive the frame with an external network such as a wired network or the like. Such a DS is not necessarily a network, and the DS is not limited to its shape as long as it can provide predetermined distribution services defined in IEEE 802.11. For example, the DS may be a wireless network such as a mesh network, or a physical structure for allowing APs to be associated with one another.

In the infrastructure BSS, the terminal STA may be associated with the AP. The terminal STA may transmit and receive data when being associated with the AP.

Figure 3:
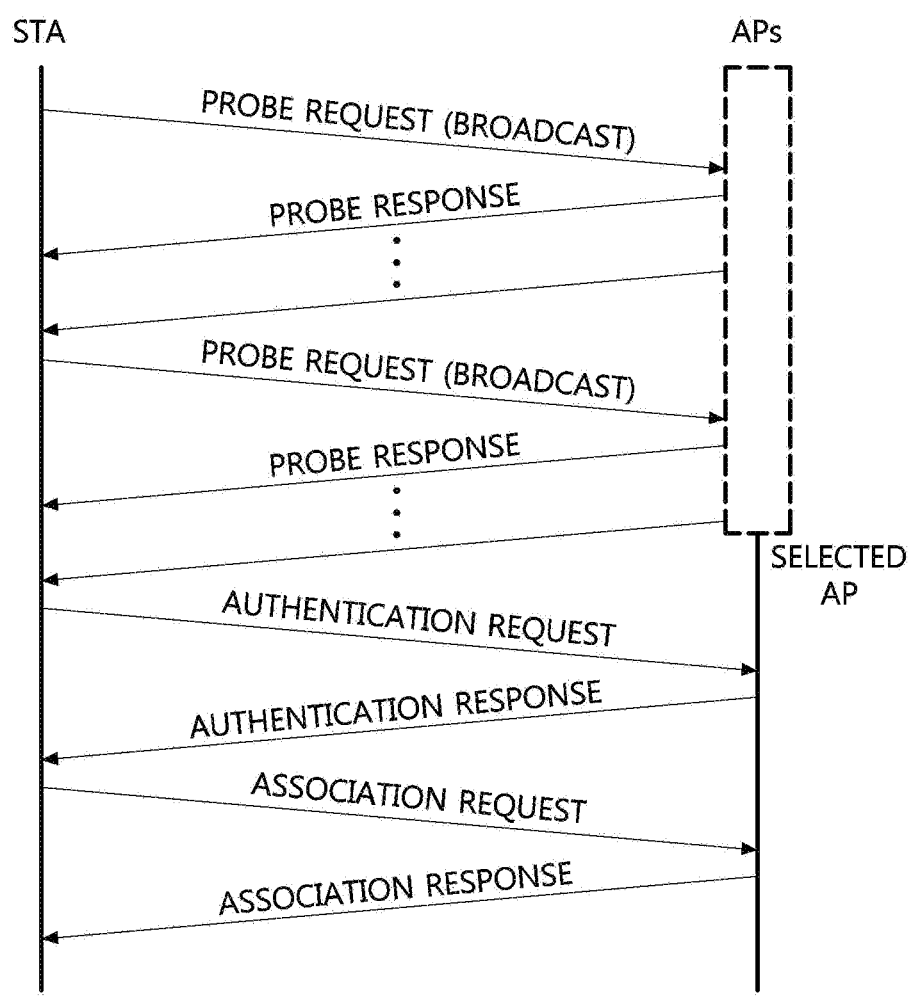
FIG. 3 is a flowchart illustrating an association procedure of a terminal in an infrastructure basic service set (BSS)

FIG. 3 is a flowchart illustrating an association procedure of a terminal in an infrastructure BSS.

Referring to FIG. 3, an association procedure of the terminal STA in the infrastructure BSS may be roughly divided into a probe step that detects an AP, an authentication step with the detected AP, and an association step with the AP having performed an authentication procedure.

The terminal STA may detect neighbor APs using a passive scanning method or an active scanning method. In a case of using the passive scanning method, the terminal STA may detect the neighbor APs by overhearing beacons transmitted by APs. In a case of using the active scanning method, the terminal STA may detect the neighbor APs by transmitting a probe request frame and receiving a probe response frame that is a response to the probe request frame from the APs.

When detecting the neighbor APs, the terminal STA may perform an authentication step with the detected AP. In this case, the terminal STA may perform the authentication step with a plurality of APs. Authentication algorithms according to IEEE 802.11 may be divided into an open system algorithm that exchanges two authentication frames, a shared key algorithm that exchanges four authentication frames, and the like.

Based on the authentication algorithm according to IEEE 802.11, the terminal STA may complete authentication with the AP by transmitting an authentication request frame and receiving an authentication response frame that is a response to the authentication request frame from the AP.

When completing authentication, the terminal STA may perform an association step with the AP. In this case, the terminal STA may select one AP among the APs having performed the authentication step with the terminal STA itself, and perform an association step with the selected AP. That is, the terminal STA may complete association with the selected AP by transmitting an association request frame to the selected AP and receiving an association response frame that is a response to the association request frame from the selected AP.

Figure 4:
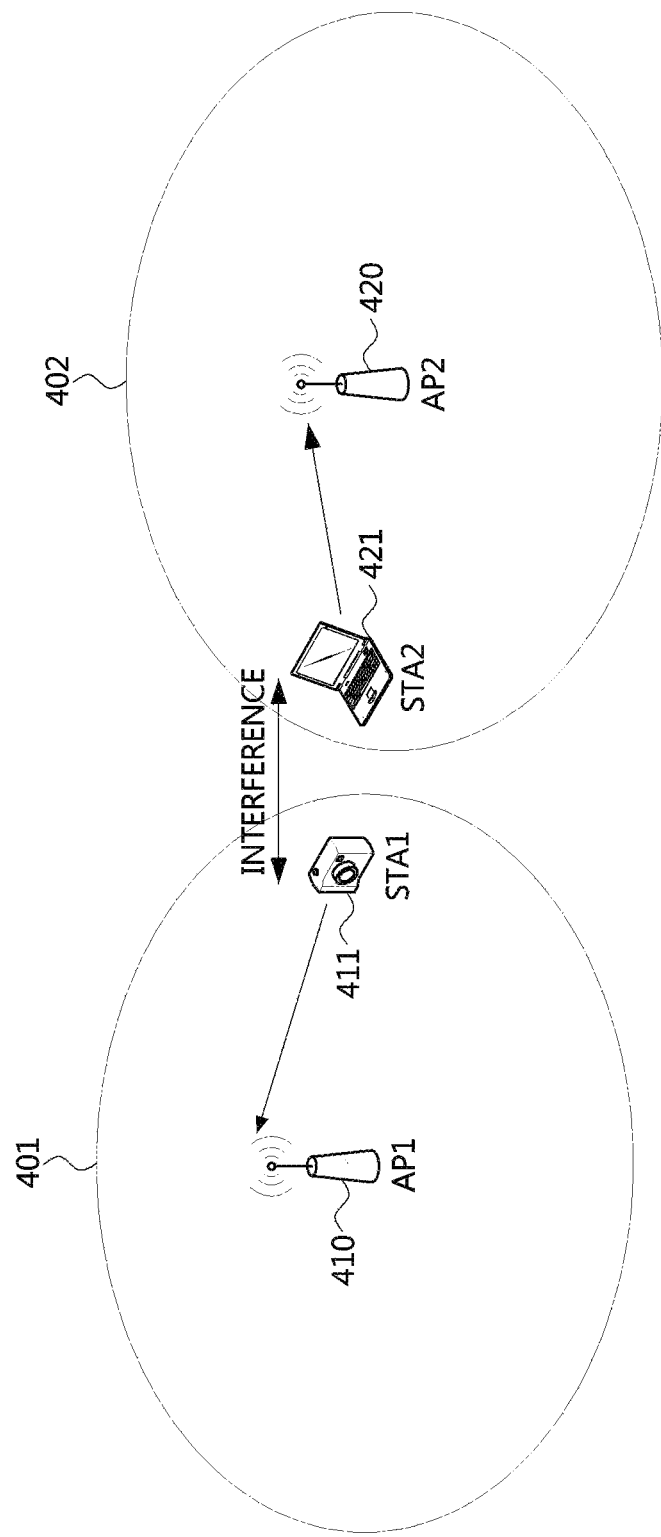
FIG. 4 is a conceptual diagram illustrating an exposed node problem.

FIG. 4 is a conceptual diagram illustrating an exposed node problem.

Referring to FIG. 4, a first access point (AP) 410 and a first terminal 411 may constitute a first infrastructure BSS 401, and a second AP 420 and a second terminal 421 may constitute a second infrastructure BSS 402. The first AP 410 may receive a frame transmitted from the first terminal 411, but may not receive frames transmitted from the second AP 420 and the second terminal 421.

The first terminal 411 may receive frames transmitted from the first AP 410 and the second terminal 421, but may not receive a frame transmitted from the second AP 420. The second terminal 421 may receive frames transmitted from the first terminal 411 and the second AP 420, but may not receive a frame transmitted from the first AP 410. The second AP 420 may receive a frame transmitted from the second terminal 421, but may not receive frames transmitted from the first AP 410 and the first terminal 411.

Here, in an environment in which two infrastructure BSSs are adjacent to each other (or overlapped environment), an exposed node problem will be described, but may occur even in an environment in which at least two Ad-hoc networks exist. Hereinafter, in a case in which the first terminal 411 is associated with the first AP 410 to transmit a frame, effects of the first infrastructure BSS 401 on the second infrastructure BSS 402 will be described.

Each of communication objects (that is, AP or terminal) may retrieve a channel before transmitting a corresponding frame in a carrier sense multiple access (CSMA) method. Thus, the second terminal 421 may determine that the first terminal 411 transmits the corresponding frame through channel retrieval before transmitting the corresponding frame, and may not transmit the corresponding frame until frame transmission of the first terminal 411 is completed.

For example, according to the IEEE 802.11 standard, the second terminal 421 may receive a request to send (RTS) frame transmitted from the first terminal 411 based on a clear channel assessment (CCA) method of an MAC layer. The second terminal 421 may set a network allocation vector (NAV) based on a period indicated by a duration field included in an MAC header of the RTS frame, and may not transmit a corresponding frame for a period during which the NAV is set.

Meanwhile, in a case in which the first AP 410 that receives the frame transmitted from the first terminal 411 is positioned outside an interference region of the second terminal 421 (that is, a case in which the frame transmitted from the second terminal 421 is not normally received from the first AP 410), although the second terminal 421 transmits the corresponding frame to the second AP 420 during which the first terminal 411 transmits the corresponding frame to the first AP 410, the first AP 410 may normally receive the frame transmitted from the first terminal 411, and the second AP 420 may also normally receive the frame transmitted from the second terminal 421.

In this manner, the reason why only one terminal 411 or 421 should transmit the corresponding frame although each of the APs 410 and 420 can simultaneously receive the corresponding frame is because a procedure of retrieving a channel is first performed before transmitting the corresponding frame in the CSMA method. This is called an exposed node problem.

The exposed node problem corresponds to a case in which a corresponding frame is not transmitted although it can be transmitted, and therefore the transmission capacity of the communication system may be accordingly reduced. In a case of the CSMA method that exchanges an RTS frame and a clear to send (CTS) frame, the solution to the exposed node problem has been conceptually known. That is, in a case in which the communication object receives the RTS frame but cannot receive the CTS frame that is the response to the RTS frame, it is possible to transmit the corresponding frame within a signal range of the communication object that has transmitted the RTS frame. However, when this solution is applied to an actual system, a time to listen cannot be sufficiently ensured due to characteristics of the CSMA method on the assumption of a listen before talk (LBT) method, and therefore the communication object cannot transmit the corresponding frame simultaneously with other communication objects. This problem will be described in detail as below.

Figure 5:
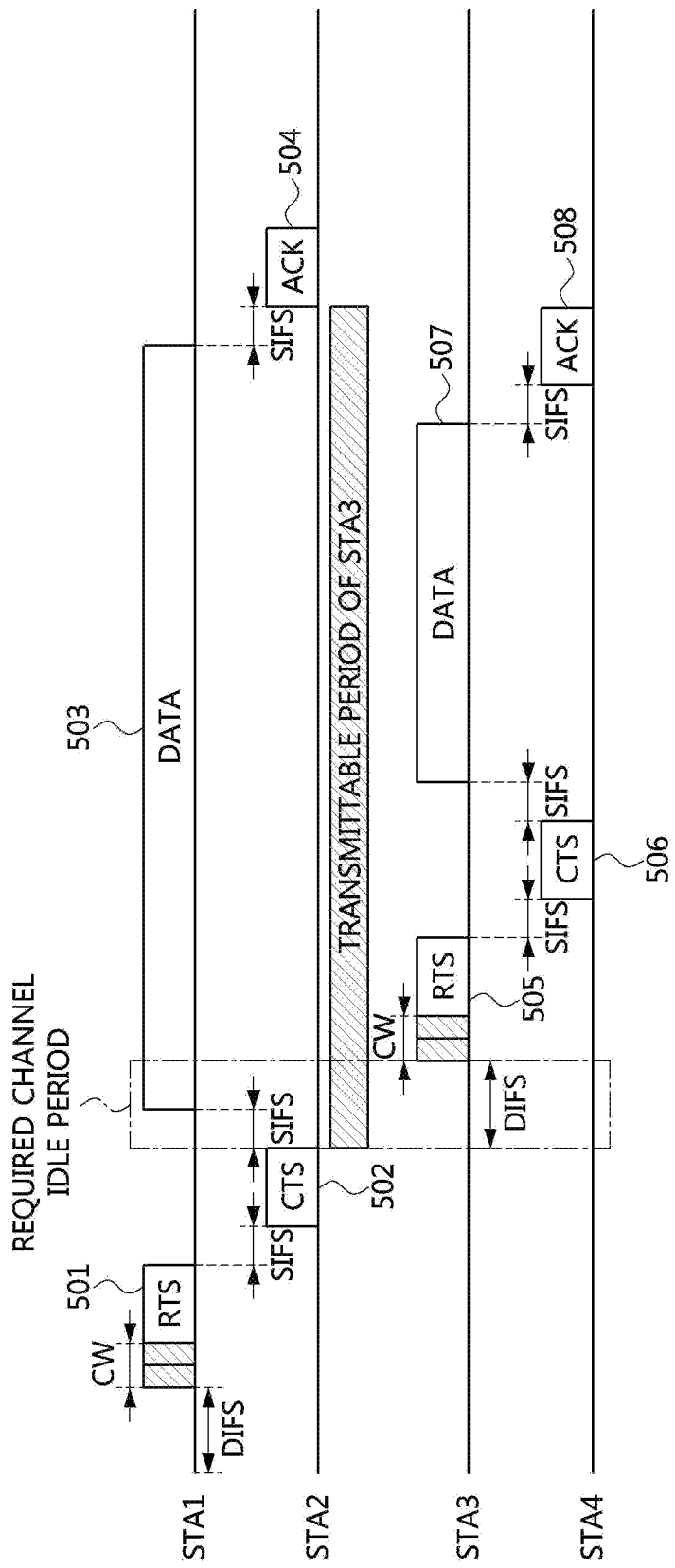
FIG. 5 is a conceptual diagram illustrating a case in which a solution to an exposed node problem is applied.
Figure 6:
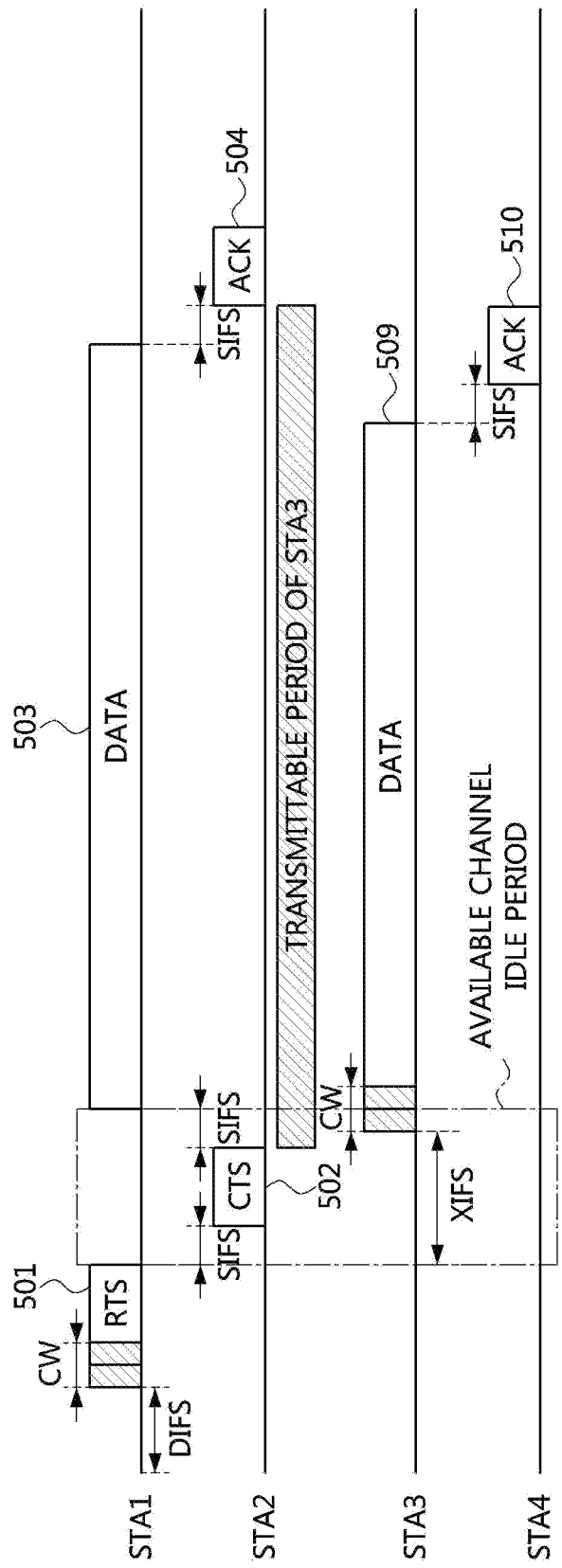
FIG. 6 is a conceptual diagram illustrating a case in which other solution to an exposed node problem is applied.

FIG. 5 is a conceptual diagram illustrating a case in which a solution to an exposed node problem is applied, and FIG. 6 is a conceptual diagram illustrating a case in which other solution to an exposed node problem is applied.

Referring to FIGS. 5 and 6, a first station STA1 and a second station STA2 may constitute the first infrastructure BSS 401 of FIG. 4. A third station STA3 and a fourth station STA4 may constitute the second infrastructure BSS 402 of FIG. 4. Each of the stations STA1, STA2, STA3, and STA 4 may refer to an AP or a terminal.

For example, the first station STA1 may be the same as the first terminal 411 of FIG. 4, and the second station STA2 may be the same as the first AP 410 of FIG. 4. The third station STA3 may be the same as the second terminal 421 of FIG. 4, and the fourth station STA4 may be the same as the second AP 420 of FIG. 4.

First, the first station STA1 may retrieve a channel during a distributed coordination function (DCF) inter-frame space (DIFS), and when a signal exceeding a preset signal size is not detected based on the retrieval result (that is, when the channel is in an idle state), transmit an RTS frame 501 to the second station STA2 after contention window (CW) according to a random back-off procedure. When normally receiving the RTS frame 501, the second station STA2 may transmit a CTS frame 502 as a response to the RTS frame 501 to the first station STA1. In this instance, the second station STA2 may transmit the CTS frame 502 after a short inter-frame space (SIFS) from a reception termination time of the RTS frame 501.

When normally receiving the CTS frame 502, the first station STA1 may transmit a data frame 503 to the second station STA2 after the SIFS from a reception termination time of the CTS frame 502. When normally receiving the data frame 503, the second station STA2 may transmit an acknowledgement (ACK) frame 504 as a response to the data frame 503 to the first station STA1. In this instance, the second station STA2 may transmit the ACK frame 504 after the SIFS from a reception termination time of the data frame 503. When receiving the ACK frame 504, the first station STA1 may determine that the data frame 503 is normally received from the second station STA2.

Meanwhile, when receiving the RTS frame 501 but failing to receive the CTS frame 502 that is the response to the RTS frame 501 (that is, when it is determined that the third station STA3 is an exposed node), the third station STA3 may attempt to transmit the corresponding frame after a reception termination time of the CTS frame 502. In this case, the third station STA3 may transmit the corresponding frame during the period from the reception termination time of the CTS frame 502 to a reception start time of the ACK frame 504 (that is, 2×SIFS+transmission period of data frame 503).

That is, the third station STA3 may retrieve a corresponding channel during the DIFS after the reception termination time of the CTS frame 502, and when a signal exceeding a preset signal size is not detected based on the retrieval result (that is, in a case in which the channel is in an idle state), transmit an RTS frame 505 to the fourth station STA4 after contention window (CW) according to the random back-off procedure. However, after the SIFS from the reception termination time of the CTS frame 502 (generally, SIFS<DIFS), the data frame 503 may be transmitted from the first station STA1, and the third station STA3 may detect the data frame 503 when retrieving the channel.

The data frame 503 corresponds to a high interference signal from the side of the third station STA3, and therefore it is difficult for the third station STA3 to acquire a sufficient signal to noise ratio (SNR) with respect to frames transmitted from other communication objects. Thus, it is difficult for third station STA3 to accurately determine a channel state (that is, busy or idle) during the DIFS after the reception termination time of the CTS frame 502. That is, the third station STA3 cannot ensure the DIFS that is a time for determining the channel state, and thereby may not transmit the frame simultaneously with the first station STA1.

If the time for determining the channel state is defined as an SIFS shorter than the DIFS, the third station STA3 may transmit the corresponding frame simultaneously with the first station STA1. However, to define the time for determining the channel state as the SIFS is to give the same priority as that of the communication object that won the competition to the third station STA3, and therefore this does not correspond to the CSMA method. Thus, it is not easy that the above-described solution to the exposed node problem is directly applied to the communication system according to the CSMA method.

In other embodiment, the third station STA3 may directly transmit a data frame 509 to the fourth station STA4 without a RTS-CTS protocol. That is, when the channel is in an idle state (that is, when the CTS frame 502 in response to the RTS frame 501 is not received) during the preset time (XIFS) from a reception termination time of the RST frame 501, the third station STA3 may transmit the data frame 509 to the fourth station STA4 after contention window CW according to the random back-off procedure. Here, the length of the data frame 509 may be less than the length corresponding to 'a transmittable time of the third station STA3.'

When the data frame 509 is received, the fourth station STA4 may transmit an ACK frame 510 in response to the data frame 509 to the third station STA3. In this instance, the fourth station STA4 may transmit the ACK frame 510 after a transmission termination time of the data frame 503 to avoid collision between the data frame 503 and the ACK frame 510. Alternatively, when it is set that a response about reception success or failure of the data frame 509 between the third station STA3 and the fourth station STA4 is not transmitted and received, the fourth station STA4 may not transmit the ACK frame 510 in response to the data frame 509 if the data frame 509 has been received.

Meanwhile, the blocked node problem is a problem that occurs when the exposed node problem is not solved, and therefore the transmission capacity of the communication system may be reduced due to the blocked node problem.

Figure 7:
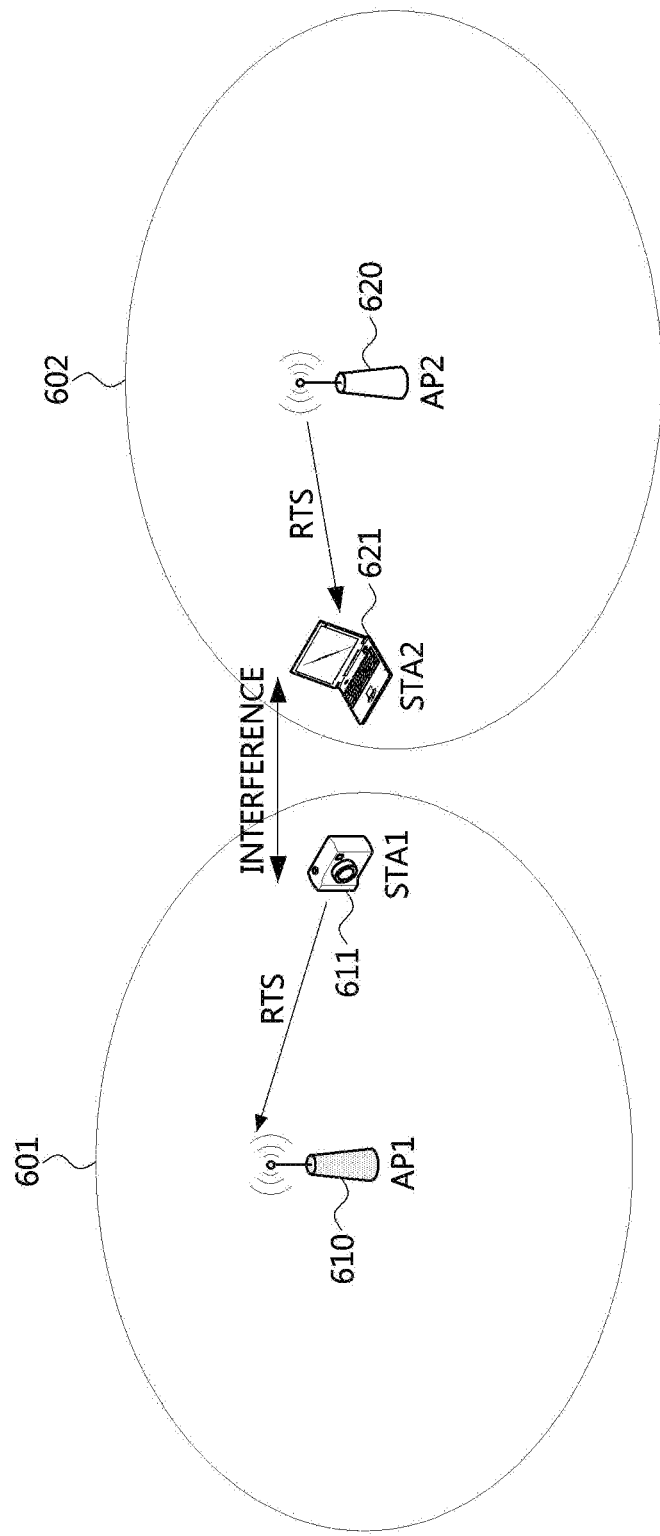
FIG. 7 is a conceptual diagram illustrating a blocked node problem.

FIG. 7 is a conceptual diagram illustrating a blocked node problem.

Referring to FIG. 7, a first AP 610 and a first terminal 611 may constitute a first infrastructure BSS 601, and a second AP 620 and a second terminal 621 may constitute a second infrastructure BSS 602. The first AP 610 may receive a frame transmitted from the first terminal 611, but may not receive frames transmitted from the second AP 620 and the second terminal 621.

The first terminal 611 may receive frames transmitted from the first AP 61.0 and the second terminal 621, but may not receive a frame transmitted from the second AP 620. The second terminal 621 may receive frames transmitted from the first terminal 611 and the second AP 620, but may not receive a frame transmitted from the first AP 610. The second AP 620 may receive a frame transmitted from the second terminal 621, but may not receive frames transmitted from the first AP 610 and the first terminal 611.

Here, in an environment in which two infrastructure BSSs are adjacent to each other (or overlapped environment), a blocked node problem will be described, but may occur even in an environment in which at least two Ad-hoc networks exist.

The first terminal 611 may transmit an RTS frame to the first AP 610. In this case, the second terminal 621 may receive the RTS frame transmitted from the first terminal 611, and thereby may set an NAV based on a period indicated by a duration field included in an MAC header of the RTS frame, and may not transmit a corresponding frame for a period during which the NAV is set. In this instance, frame transmission is stopped by NAV setting, and therefore the second terminal 621 may correspond to a blocked node.

Meanwhile, the second AP 620 cannot receive the RTS frame transmitted from the first terminal 611, and thereby can transmit the corresponding frame regardless of NAV that is set based on the corresponding RTS frame. That is, while the second terminal 621 is operated in a state in which the second terminal 621 cannot transmit the corresponding frame by NAV setting, the second AP 620 may transmit the RTS frame to the second terminal 621 when there is data to be transmitted to the second terminal 621.

In this case, the second terminal 621 may face two cases. In a first case, an RTS frame transmitted from the first terminal 611 or a data frame collides with an RTS frame transmitted from the second AP 620, and therefore the second terminal 621 cannot normally receive the RTS frame transmitted from the second AP 620. In a second case, when normally receiving the RTS frame transmitted from the second AP 620, the second terminal 621 cannot transmit a CTS frame that is a response to the RTS frame to the second AP 620 by NAV that is set based on the RTS frame received from the first terminal 611.

In both cases, the second AP 620 cannot receive the CTS frame that is the response to the RTS frame from the second terminal 621, and thereby re-transmits the RTS frame to the second terminal 621. Thus, the time is wasted by the time during which the RTS frame is re-transmitted to the second terminal 621, and this is called the blocked node problem.

Figure 8:
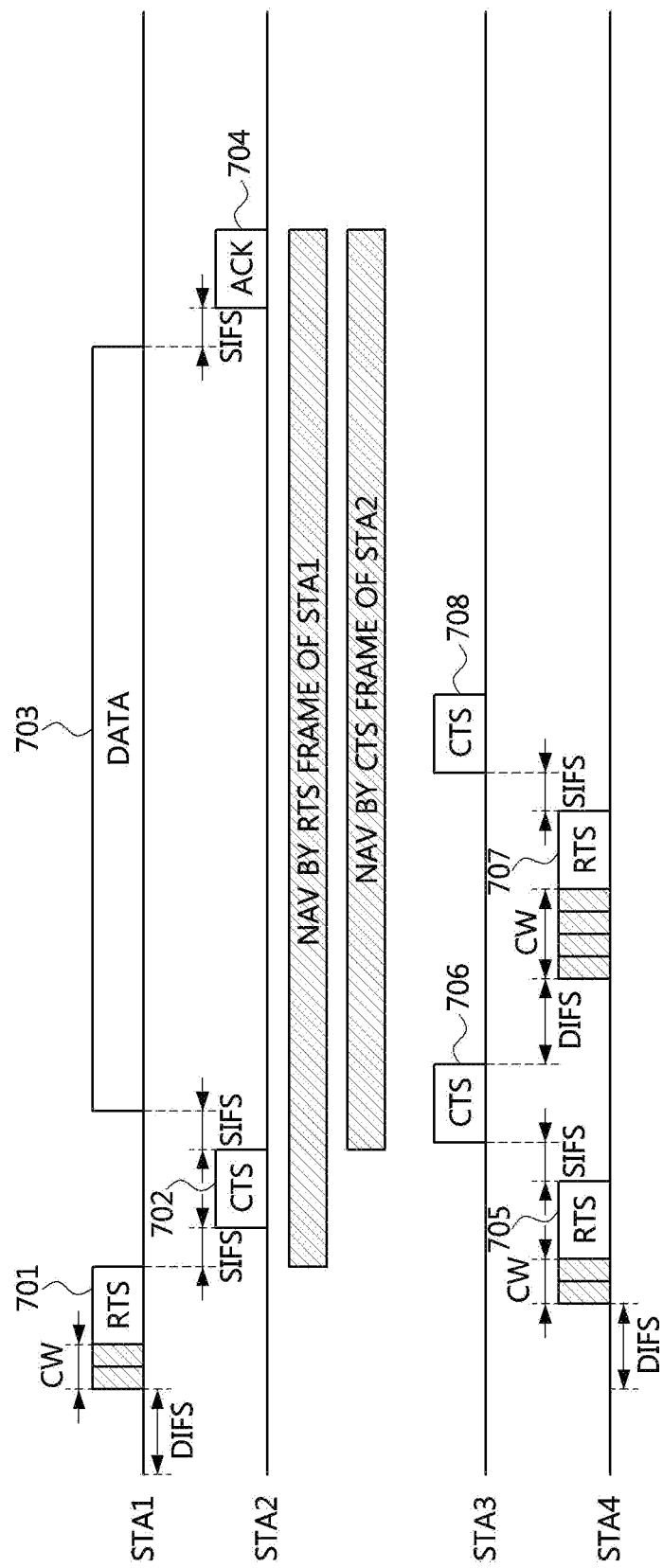
FIG. 8 is a conceptual diagram illustrating effect of a blocked node on a communication system.

FIG. 8 is a conceptual diagram illustrating effect of a blocked node on a communication system.

Referring to FIG. 8, a first station STA1 and a second station STA2 may constitute the first infrastructure BSS 601 of FIG. 7. A third station STA3 and a fourth station STA4 may constitute the second infrastructure BSS 602 of FIG. 7. Each of the stations STA1, STA2, STA3, and STA4 may refer to an AP or a terminal.

For example, the first station STA1 may be the same as the first terminal 611 of FIG. 7, and the second station STA2 may be the same as the first AP 610 of FIG. 7. The third station STA3 may be the same as the second terminal 621 of FIG. 7, and the fourth station STA4 may be the same as the second AP 620 of FIG. 7.

First, the first station STA1 may retrieve a channel during DIFS, and when a signal exceeding a preset signal size is not detected based on the retrieval result (that is, when the channel is in an idle state), transmit an RTS frame 701 to the second station STA2 after contention window (CW) according to a random back-off procedure. When normally receiving the RTS frame 701, the second station STA2 may transmit a CTS frame 702 as a response to the RTS frame 701. In this instance, the second station STA2 may transmit the CTS frame 702 after the SIFS from a reception termination time of the RTS frame 701.

When normally receiving the CTS frame 702, the first station STA1 may transmit a data frame 703 to the second station STA2 after the SIFS from a reception termination time of the CTS frame 702. When normally receiving the data frame 703, the second station STA2 may transmit an ACK frame 704 as a response to the data frame 703 to the first station STA1. In this instance, the second station STA2 may transmit the ACK frame 704 after the SIFS from a reception termination time of the data frame 703. When receiving the ACK frame 704, the first station STA1 may determine that the data frame 703 is normally received from the second station STA2.

Meanwhile, when receiving the RTS frame 701 from the first station STA1, the third station STA3 may set an NAV based on a period indicated by a duration field included in an MAC header of the RTS frame 701, and may not transmit a corresponding frame for a period during which the set NAV is indicated. The fourth station STA4 cannot normally receive the RTS frame 701 or the CTS frame 702, and thereby does not set the NAV based on the RTS frame 701 or the CTS frame 702. Thus, when there is data to be transmitted to the third station STA3, the fourth station STA4 may transmit an RTS frame 705 to the third station STA3 regardless of the NAV that is set based on the RTS frame 701 or the CTS frame 702. In this instance, the fourth station STA4 may retrieve a channel during DIFS, and when a signal exceeding a preset signal size is not detected based on the retrieval result (that is, when the channel is in an idle state), transmit the RTS frame 705 to the third station STA3 after contention window (for example, CW=2) according to the random back-off procedure.

The third station STA3 may receive the RTS frame 705 from the fourth station STA4. However, the third station STA3 is in a state in which the third station STA3 cannot transmit the corresponding frame by NAV that is set based on the RTS frame 701 received from the first station STA1, and thereby cannot transmit a CTS frame 706 that is a response to the RTS frame 705 to the fourth station STA4. In this case, the fourth station STA4 cannot receive the CTS frame 706 from the third station STA3 until a reception termination time (that is, CTS timeout) of the CTS frame 706 that is the response to the RTS frame 705, and therefore may perform a re-transmission process of the RTS frame.

That is, the fourth station STA4 may retrieve a corresponding channel during DIFS from the reception termination time of the CTS frame 706, and when a signal exceeding a preset signal size is not detected based on the retrieval result (that is, when the channel is in to an idle state), transmit an RTS frame 707 to the third station STA3 after contention window (for example, CW=4) according to the random back-off procedure. In this instance, the RTS frame 705 fails to be transmitted, and therefore the contention window (CW) used for transmission of the RTS frame 707 may be twice the contention window (CW) used for transmission of the RTS frame 705. Meanwhile, since the data frame 703 transmitted from the first station STA1 and the RTS frame 707 transmitted from the second AP 620 collide with each other, the third station STA3 may not normally receive the RTS frame 707. In this case, the fourth station STA4 may not receive a CTS frame 708 from the third station STA3 until the reception termination time of the CTS frame 708 that is a response to the RTS frame 707, and thereby may perform the re-transmission process of the RTS frame again.

In this manner, the fourth station STA4 may waste an unnecessary time by the re-transmission of the RTS frame. That is, the performance of the communication system may be significantly degraded due to the blocked node problem.

The solutions to the exposed node problem and the blocked node problem will be described in detail as below. A station that performs the methods according to the present invention may be the same as the station shown in FIG. 1. In particular, a configuration of a processor constituting the station shown in FIG. 1 may be as follows.

Figure 9:
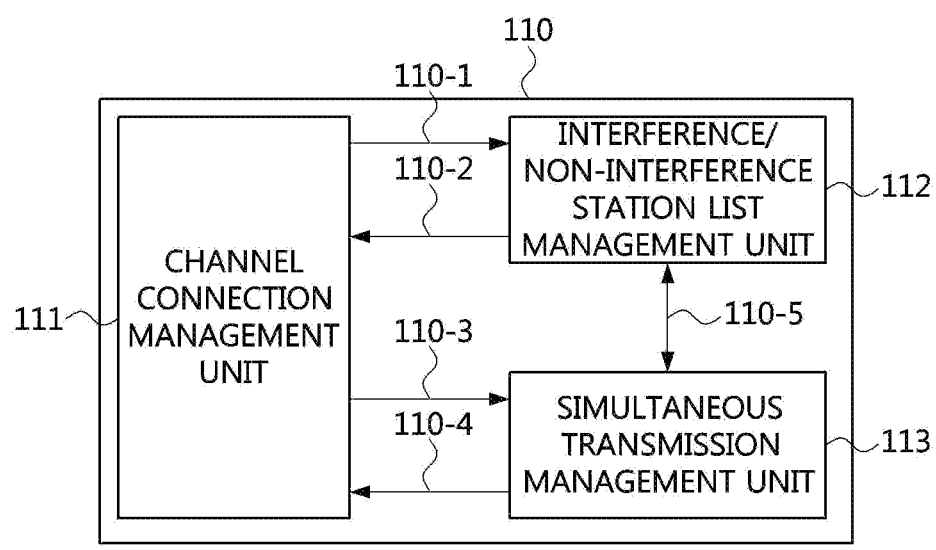
FIG. 9 is a block diagram illustrating a configuration of a processor constituting a station.

FIG. 9 is a block diagram illustrating a configuration of a processor constituting a station.

Referring to FIG. 9, a processor 110 may include a channel connection management unit 111, an interference/non-interference station list management unit 112, and a simultaneous transmission management unit 113. Here, the channel connection management unit 111 may mean a conventional configuration that is responsible for transmission among stations. The channel connection management unit 111 and the interference/non-interference station list management unit 112 may be connected to each other via a first interface 110-1 and a second interface 110-2. The channel connection management unit 111 and the simultaneous transmission management unit 113 may be connected to each other via a third interface 110-3 and a fourth interface 110-4. The interference/non-interference station list management unit 112 and the simultaneous transmission management unit 113 may be connected to each other via a fifth interface 110-5.

The interference/non-interference station list management unit 112 may perform generation, management, updating, and the like of an interference station list and a non-interference station list based on information transmitted from the channel connection management unit 111 via the first interface 110-1. In addition, the interference/non-interference station list management unit 112 may transmit at least one of the interference station list and the non-interference station list to the channel connection management unit 111 via the second interface 110-2 in accordance with a request from the channel connection management unit 111 via the first interface 110-1. In addition, the interference/non-interference station list management unit 112 may transmit the at least one of the interference station list and the non-interference station list to the simultaneous transmission management unit 113 via the fifth interface 110-5 in accordance with a request from the simultaneous transmission management unit 113.

The simultaneous transmission management unit 113 may determine whether simultaneous transmission is possible based on the at least one of the interference station list and the non-interference station list acquired from the interference/non-interference station list management unit 112, and perform simultaneous transmission with other communication objects when the simultaneous transmission is possible.

Figure 10:
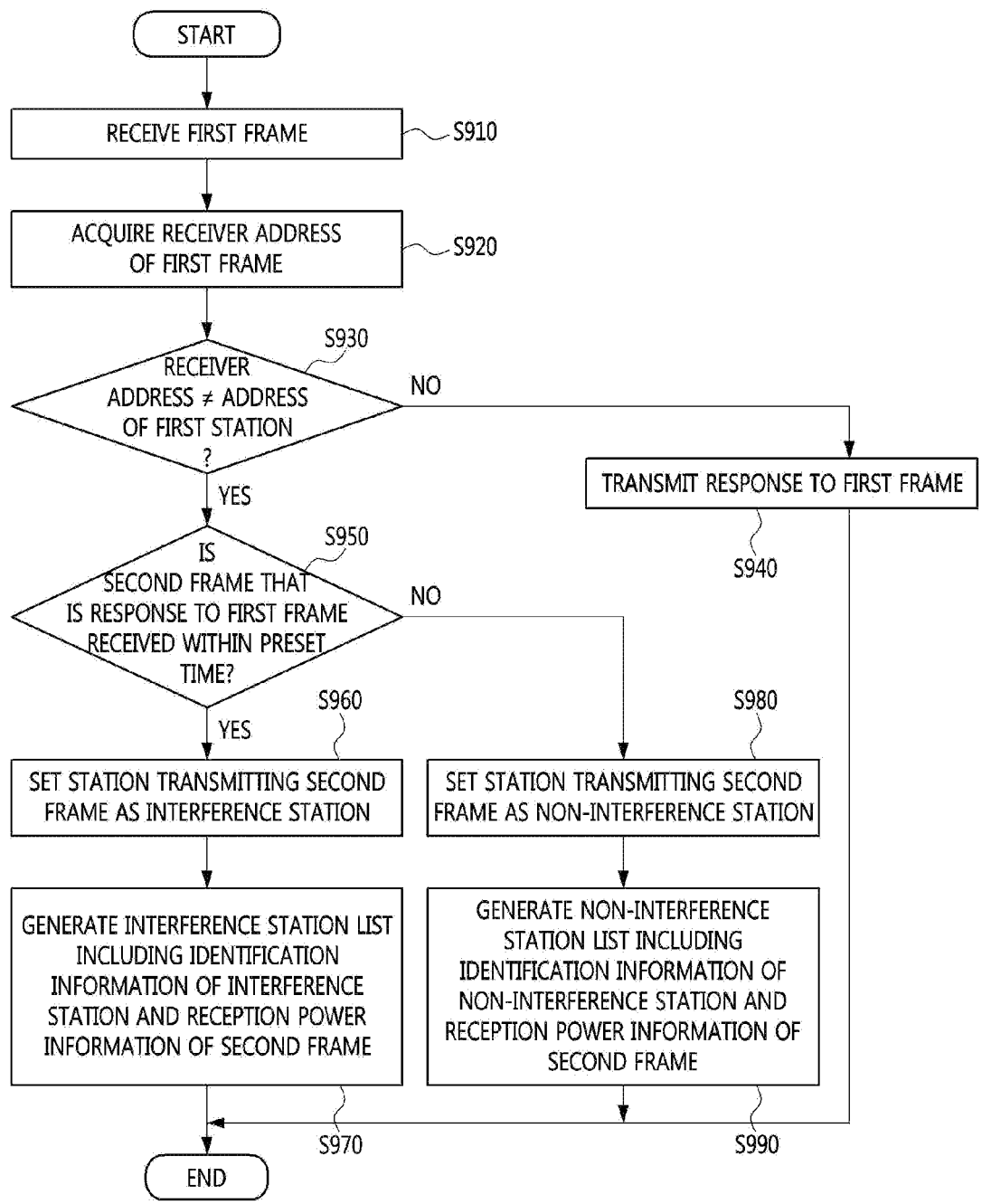
FIG. 10 is a flowchart illustrating a method for generating interference/non-interference station lists according to an embodiment of the present invention.

FIG. 10 is a flowchart illustrating a method for generating interference/non-interference station lists according to an embodiment of the present invention.

Referring to FIG. 10, in operation S910, a first station may receive a first frame from a second station through channel retrieval (for example, CCA). Each of the first station and the second station may refer to an AP or a terminal. Here, the first frame may be a probe request frame, an authentication request frame, an association request frame, a reassociation request frame, an RTS frame, a data frame, or a block acknowledgement request (BAR) frame.

In operation S920, the first station may acquire a receiver address (RA) of the first frame from an address field included in an MAC header of the first frame. In operation S930, the first station may determine whether a station indicated by the receiver address of the first frame is the first station. In operation S940, when the station indicated by the receiver address of the first frame is the first station, the first station may transmit a response to the first frame to the second station after an SIFS from a reception termination time of the first frame.

On the other hand, when the station indicated by the receiver address of the first frame is a third station different from the first station, the first station may generate interference/non-interference station lists as follows. In operation S950, the first station may determine whether to receive a second frame that is a response to the first frame transmitted from the third station indicated by the receiver address of the first frame within a preset time from the reception termination time of the first frame. Here, the third station may refer to an AP or a terminal, and the preset time may refer to the SIFS. The second frame may be a probe response frame, an authentication response frame, an association response frame, a reassociation response frame, a CTS frame, an ACK frame, or a block acknowledgement (BA) frame.

In operation S960, when normally receiving the second frame within the preset time, the first station may set the third station as an interference station. In operation S970, the first station may generate an interference station list including identification information (for example, MAC address, association identifier (AID), partial association identifier (PAID), and the like) of the third station and reception power information of the second frame measured in the first station.

On the other hand, in operation S980, when failing to normally receiving the second frame within the preset time, the first station may set the third station as a non-interference station. In operation S990, the first station may generate a non-interference station list including identification information of the third station and reception power information of the second frame measured in the first station.

Hereinafter, a method for transmitting a frame based on the interference station list and the non-interference station list will be described in detail.

Figure 11:
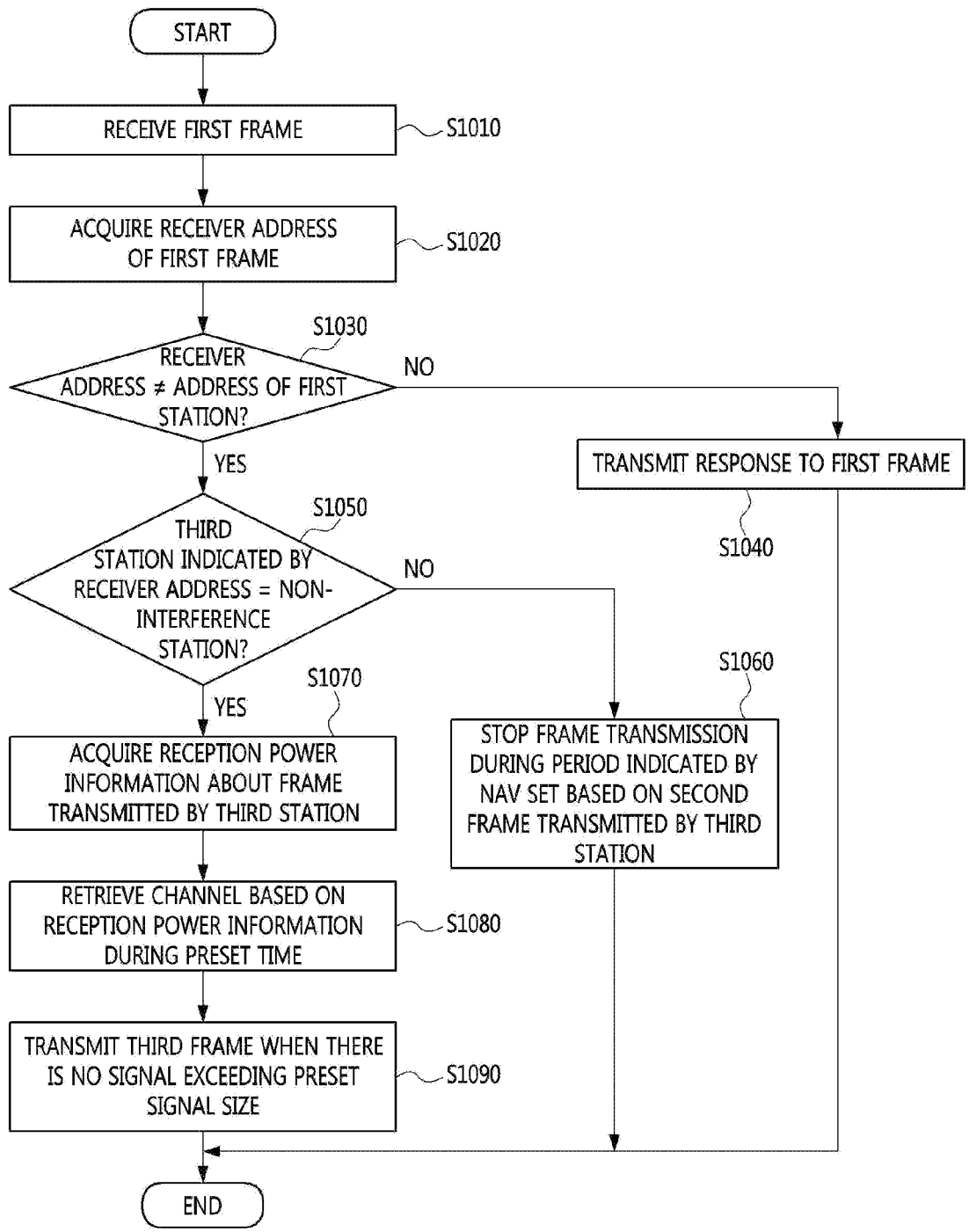
FIG. 11 is a flowchart illustrating a method for transmitting a frame according to an embodiment of the present invention.

FIG. 11 is a flowchart illustrating a method for transmitting a frame according to an embodiment of the present invention.

Referring to FIG. 11, in operation S1010, a first station may receive a first frame from a second station through channel retrieval (for example, CCA). Each of the first station and the second station may refer to an AP or a terminal. Here, the first frame may be an RTS frame, a data frame, or a BAR frame.

In operation S1020, the first station may acquire a receiver address of the first frame from an address field included in an MAC header of the first frame. In operation S1030, the first station may determine whether a station indicated by the receiver address of the first frame is the first station. In operation S1040, when the station indicated by the receiver address of the first frame is the first station, the first station may transmit a response to the first frame to the second station after an SIFS from a reception termination time of the first frame.

On the other hand, when the station indicated by the receiver address of the first frame is a third station different from the first station, the first station may transmit a corresponding frame as follows. In operation S1050, the first station may determine whether the third station (that is, the third station that transmits a second frame that is a response to the first frame) indicated by the receiver address of the first frame is an interference station or a non-interference station based on an interference station list and a non-interference station list which are generated in advance. Here, the third station may refer to an AP or a terminal. The second frame may be a CTS frame, an ACK frame, or a BA frame.

The interference station list and the non-interference station list may be the same as the interference station list and the non-interference station list described with reference to FIG. 10. The interference station list may include identification information of an interference station and reception power information of a frame transmitted from the interference station. The non-interference station list may include identification information of a non-interference station and reception power information of a frame transmitted from the non-interference station.

In operation S1060, when the identification information of the third station is included in the interference station list (that is, when the third station is the interference station), the first station may receive the second frame transmitted from the third station, set an NAV based on a period indicated by a duration field included in an MAC header of the second frame, and may not transmit a frame during a period indicated by the set NAV.

On the other hand, when the identification information of the third station is included in the non-interference station list (that is, when the third station is the non-interference station), the first station may transmit a third frame to other communication objects. Specifically, in operation S1070, the first station may acquire, from the non-interference station list, reception power information about the frame transmitted by the third station.

In operation S1080, the first station may retrieve a channel during a preset time based on the acquired reception power information. That is, the first station may adjust a preset signal size (that is, a signal size used for determining an idle state of the channel) based on the reception power information acquired from the non-interference station list in order to remove an effect of the frame transmitted from the third station when retrieving the channel. For example, the first station may set a difference between the preset signal size and reception power indicated by the reception power information as a new preset signal size, and determine whether a signal exceeding the new preset signal size is detected through channel retrieval. Here, the preset time may be a DIFS, a PIFS, or an AIFS.

In operation S1090, when the signal exceeding the new preset signal size is not detected during the preset time, the first station may determine that the corresponding channel is in an idle state, and transmit the third frame to other communication objects. Here, the third frame may be an RTS frame or a frame (hereinafter, referred to as a prevent to send (PTS) frame that is prevented from being transmitted to the first station. The PTS frame may include at least one of a transmitter address (TA) of the PTS frame, period information during which transmission of the corresponding frame is stopped, and a receiver address of the PTS frame.

When having data to be transmitted to other communication objects, the first station may transmit the RTS frame as the third frame to the other communication objects. In this case, the first station may transmit a data frame to the other communication objects through exchange between the RTS frame and the CTS frame. Through this, the exposed node problem may be solved.

On the other hand, when not having data to be transmitted to the other communication objects, the first station may transmit the PTS frame as the third frame. In this instance, the first station may transmit the PTS frame in a broadcast method, a multicast method, or a unicast method. Each of the communication objects having received the PTS frame may acquire a transmitter address of the PTS frame included in the PTS frame, and may not transmit a corresponding frame to the first station indicated by the transmitter address. In addition, each of the communication objects having received the PTS frame may further acquire period information during which frame transmission is stopped, which is included in the PTS frame, and may not transmit the corresponding frame to the first station during a period indicated by the period information during which transmission of the frame is stopped. Through this, the blocked node problem may be solved.

Figure 12:
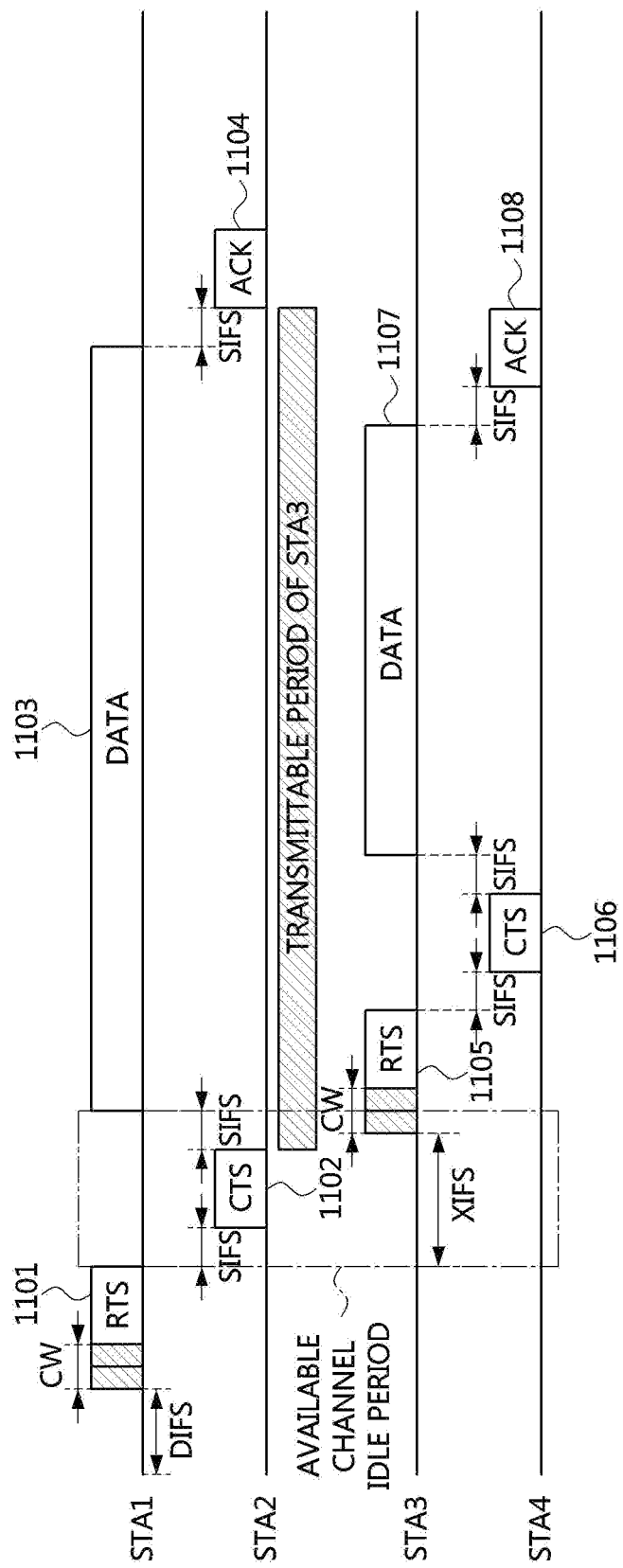
FIG. 12 is a conceptual diagram illustrating an example of a method for transmitting a data frame according to an embodiment of the present invention.
Figure 13:
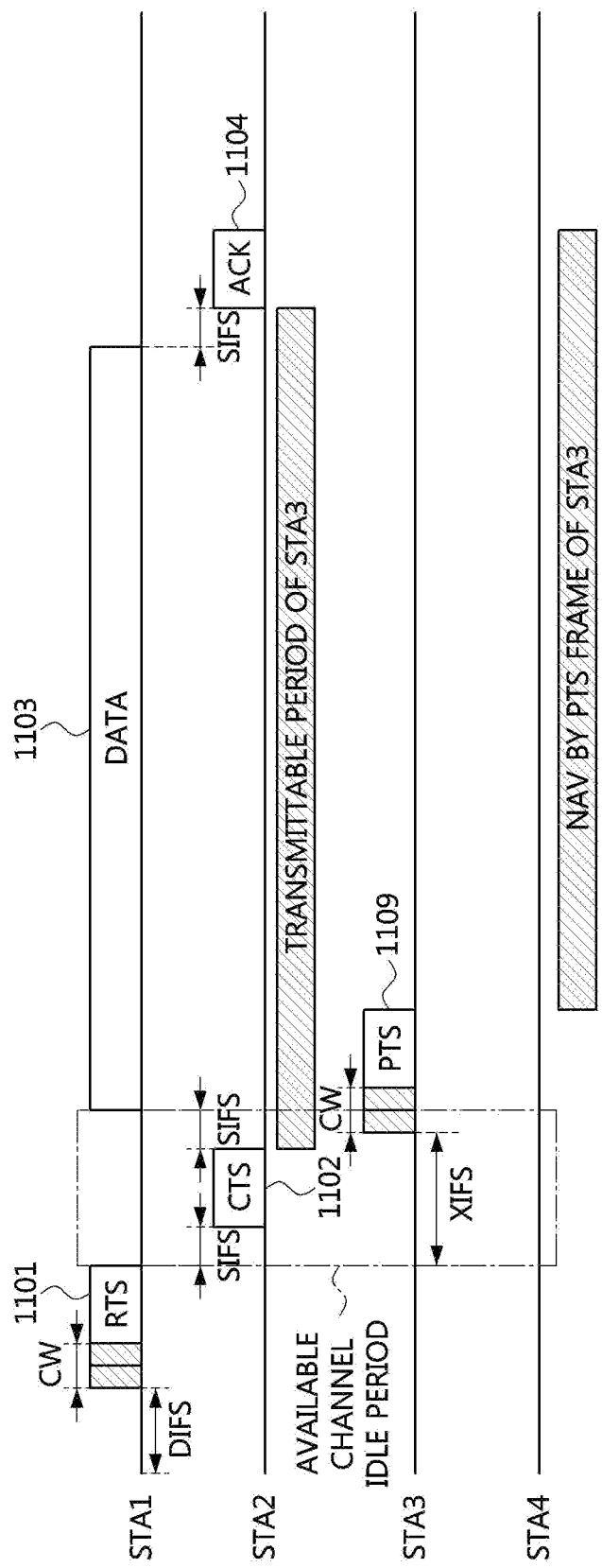
FIG. 13 is a conceptual diagram illustrating an example of a method for transmitting a prevent to send (PTS) frame according to an embodiment of the present invention.

FIG. 12 is a conceptual diagram illustrating an example of a method for transmitting a data frame according to an embodiment of the present invention, and FIG. 13 is a conceptual diagram illustrating an example of a method for transmitting a PTS frame according to an embodiment of the present invention.

Referring to FIGS. 12 and 13, a first station STA1 and a second station STA2 may constitute the first infrastructure BSS 401 of FIG. 5 or the first infrastructure BSS 601 of FIG. 7. A third station STA3 and a fourth station STA4 may constitute the second infrastructure BSS 402 of FIG. 5 or the second infrastructure BSS 602 of FIG. 7. Each of the stations STA1, STA2, STA3, and STA4 may refer to an AP or a terminal.

For example, the first station STA1 may be the same as the first terminal 411 of FIG. 5 or the first terminal 611 of FIG. 7, and the second station STA2 may be the same as the first AP 410 of FIG. 5 or the first AP 610 of FIG. 7. The third station STA3 may be the same as the second terminal 421 of FIG. 5 or the second terminal 621 of FIG. 7, and the fourth station STA4 may be the same as the second AP 420 of FIG. 5 or the second AP 620 of FIG. 7.

First, the first station STA1 may retrieve a channel during DIFS, and when a signal exceeding a preset signal size is not detected based on the retrieval result (that is, when the channel is in an idle state), transmit an RTS frame 1101 to the second station STA2 after contention window (CW) according to a random back-off procedure. When normally receiving the RTS frame 1101, the second station STA2 may transmit a CTS frame 1102 as a response to the RTS frame 1101. In this instance, the second station STA2 may transmit the CTS frame 1102 after the SIFS from a reception termination time of the RTS frame 1101.

When normally receiving the CTS frame 1102, the first station STA1 may transmit a data frame 1103 to the second station STA2 after the SIFS from a reception termination time of the CTS frame 1102. When normally receiving the data frame 1103, the second station STA2 may transmit an ACK frame 1104 as a response to the data frame 1103 to the first station STA1. In this instance, the second station STA2 may transmit the ACK frame 1104 after the SIFS from a reception termination time of the data frame 1103. When receiving the ACK frame 1104, the first station STA1 may determine that the data frame 1103 is normally received from the second station STA2.

Meanwhile, when receiving the RTS frame 1101, the third station STA3 may acquire a receiver address of the RTS frame 1101 from an address field included in an MAC header of the RTS frame 1101. The third station STA3 may determine whether the second station STA2 indicated by the receiver address is an interference station or a non-interference station based on an interference station list and a non-interference station list which are generated in advance. Here, the interference station list and the non-interference station list may be the same as the interference station list and the non-interference station list described with reference to FIG. 10. That is, the interference station list may include identification information of an interference station and reception power information of a frame transmitted from the interference station. The non-interference station list may include identification information of a non-interference station and reception power information of a frame transmitted from the non-interference station.

When the identification information of the second station STA2 is included in the interference station list, the third station STA3 may determine the second station STA2 as the interference station. In this case, the third station STA3 may set an NAV based on the RTS frame 1101, and may not transmit the corresponding frame to other communication objects during a period indicated by the set NAV.

On the other hand, when the identification information of the second station STA2 is included in the non-interference station list, the third station STA3 may determine the second station STA2 as the non-interference station. The third station STA3 may retrieve a channel during a preset time (SIFS) from the reception termination time of the RTS frame 1101, and determine presence/absence of a signal exceeding a preset size through channel retrieval. Here, the preset time (SIFS) may be a DIFS, PIFS, or AIFS. In addition, the preset time (SIFS) may be less than an available channel idle period, and the available channel idle period may be a period from the reception termination time of the RTS frame 1101 to a reception start time of the data frame 1103.

Specifically, the third station STA3 may acquire, from the non-interference station list, reception power information in the third station STA3 with respect to a frame (for example, a CTS frame that is a response to the RTS frame) transmitted by the second station STA2. The third station STA3 may retrieve a corresponding channel during the preset time (SIFS) based on the acquired reception power information. That is, the third station STA3 may adjust a preset signal size based on the reception power information about the frame transmitted by the second station STA2 in order to remove the effect of the CTS frame 1102 transmitted from the second station STA2 when retrieving the channel. For example, the third station STA3 may set a difference between the preset signal size and reception power indicated by the reception power information as a new preset signal size, and determine whether a signal exceeding the new preset signal size is detected through channel retrieval.

When the channel is in an idle state (that is, when the signal exceeding the new preset signal size is not detected) during the preset time (SIFS), the third station STA3 may be operated as follows in accordance with presence/absence of data to be transmitted to other communication objects.

Case in which Data to be Transmitted to Other Communication Objects Exists

When having data to be transmitted to the fourth station STA4, the third station STA3 may transmit an RTS frame 1105 to the fourth station STA4 after the preset time (SIFS) from the reception termination time of the RTS frame 1101. In this instance, the third station STA3 may transmit the RTS frame 1105 to the fourth station STA4 after contention window (CW) according to a random back-off procedure.

When normally receiving the RTS frame 1105, the fourth station STA4 may transmit a CTS frame 1106 that is a response to the RTS frame 1105 to the third station STA3. In this instance, the fourth station STA4 may transmit the CTS frame 1106 after the SIFS from the reception termination time of the RTS frame 1105.

When normally receiving the CTS frame 1106, the third station STA3 may transmit a data frame 1107 to the fourth station STA4 after the SIFS from the reception termination time of the CTS frame 1106. When normally receiving the data frame 1107, the fourth station STA 4 may transmit an ACK frame 1108 as a response to the data frame 1107 to the third station STA3. In this instance, the fourth station STA4 may transmit the ACK frame 1108 after the SIFS from the reception termination time of the data frame 1107. When receiving the ACK frame 1108, the third station STA3 may determine that the ACK frame 1108 is normally received in the fourth station STA4.

Here, transmission and reception of the RTS frame 1105, the CTS frame 1106, the data frame 1107, and the ACK frame 1108 may be performed from the reception termination time of the RTS frame 1101 to the reception start time of the ACK frame 1104.

Case in which Data to be Transmitted to Other Communication Objects does not Exist The third station STA3 may transmit a PTS frame 1109 after a preset time (SIFS) from the reception termination time of the RTS frame 1101. The PTS frame 1109 may refer to a frame prevented from being transmitted to the third station STA3. The PTS frame 1109 may include at least one of a transmitter address (that is, address of the third station STA3, period information during which transmission of the frame is stopped, and a receiver address. The PTS frame 1109 may be transmitted in a broadcast method, a multicast method, or a unicast method.

Meanwhile, the fourth station STA4 may receive the PTS frame 1109 from the third station STA3. The fourth station STA4 may acquire a transmitter address from the PTS frame 1109, and may not transmit the corresponding frame to the third station STA3 indicated by the transmitter address. In addition, the fourth station STA4 may further acquire, from the PTS frame 1109, period information during which transmission of the frame is stopped, to and in this case, may not transmit the corresponding frame to the third station STA3 indicated by the transmitter address for the period during which transmission of the frame is stopped. The period information during which transmission of the frame is stopped may indicate a period from the reception termination time of the PTS frame 1109 to the reception start time of the ACK frame 1104.

Figure 14:
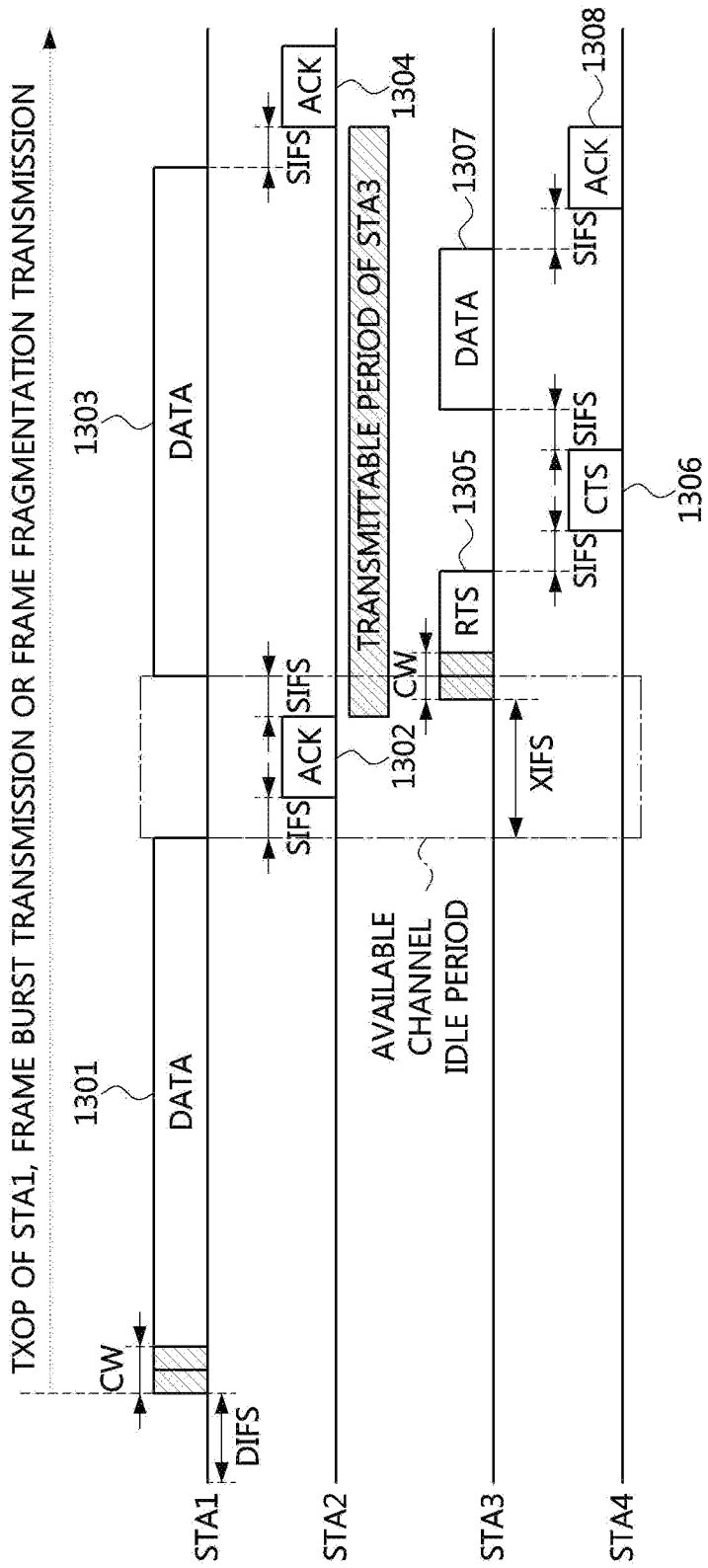
FIG. 14 is a conceptual diagram illustrating another example of a method for transmitting a data frame according to an embodiment of the present invention.
Figure 15:
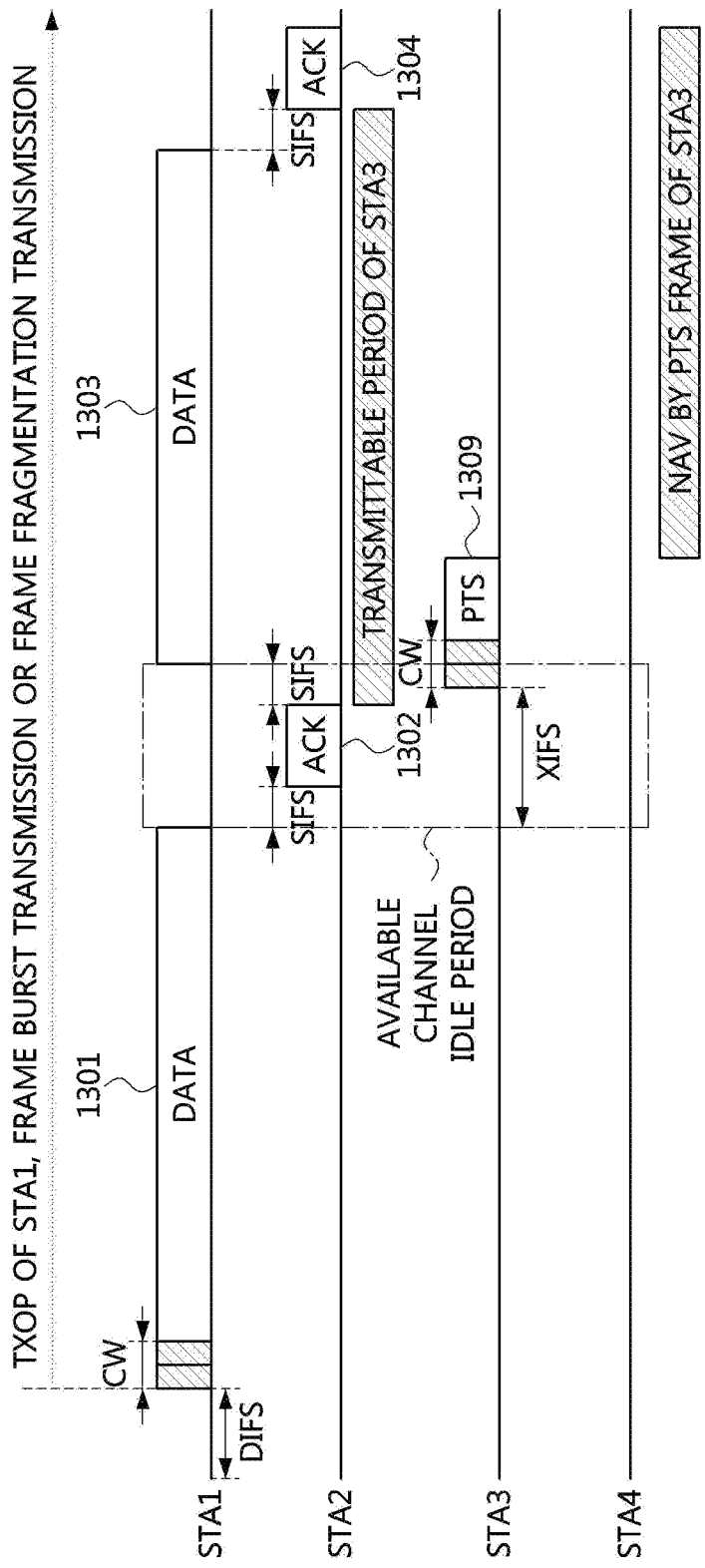
FIG. 15 is a conceptual diagram illustrating another example of a method for transmitting a PTS frame according to an embodiment of the present invention.

FIG. 14 is a conceptual diagram illustrating another example of a method for transmitting a data frame according to an embodiment of the present invention, and FIG. 15 is a conceptual diagram illustrating another example of a method for transmitting a PTS frame according to an embodiment of the present invention.

Referring to FIGS. 14 and 15, a first station STA1 and a second station STA2 may constitute the first infrastructure BSS 401 of FIG. 5 or the first infrastructure BSS 601 of FIG. 7. A third station STA3 and a fourth station STA4 may constitute the second infrastructure BSS 402 of FIG. 5 or the second infrastructure BSS 602 of FIG. 7. Each of the stations STA1, STA2, STA3, and STA4 may refer to an AP or a terminal.

For example, the first station STA1 may be the same as the first terminal 411 of FIG. 5 or the first terminal 611 of FIG. 7, and the second station STA2 may be the same as the first AP 410 of FIG. 5 or the first AP 610 of FIG. 7. The third station STA3 may be the same as the second terminal 421 of FIG. 5 or the second terminal 621 of FIG. 7, and the fourth station STA4 may be the same as the second AP 420 of FIG. 4 or the second AP 620 of FIG. 7.

The first station STA1 may continuously transmit a data frame during transmission opportunity (TXOP). In addition, the first station STA1 may transmit the data frame without exchange between the RTS frame and the CTS frame in the same manner as that in frame burst transmission or frame fragmentation transmission.

That is, the first terminal STA1 may retrieve a channel during DIFS, and when a signal exceeding a preset signal size is not detected based on the retrieval result (that is, when the channel is in an idle state), transmit a data frame 1301 to the second station STA2 after contention window (CW) according to a random back-off procedure. When normally receiving the data frame 1301, the second station STA2 may transmit an ACK frame 1302 to the first station STA1 after an SIFS from a reception termination time of the data frame 1301. When receiving the ACK frame 1302, the first station STA1 may determine that the data frame 1301 is normally received in the second station STA2.

The first station STA1 may transmit a data frame 1303 to the second station STA2 after the SIFS from the reception termination time of the ACK frame 1302. When normally receiving the data frame 1303, the second station STA2 may transmit an ACK frame 1304 to the first station STA1 after the SIFS from the reception termination time of the data frame 1303. When receiving the ACK frame 1304, the first station STA1 may determine that the data frame 1303 is normally received in the second station STA2.

Meanwhile, when receiving the data frame 1301, the third station STA3 may acquire a receiver address of the data frame 1301 from an address field included in an MAC header of the data frame 1301. The third station STA3 may determine whether the second station STA2 indicated by the receiver address is an interference station or a non-interference station based on an interference station list and a non-interference station list which are generated in advance. Here, the interference station list and the non-interference station list may be the same as the interference station list and the non-interference station list described with reference to FIG. 10. That is, the interference station list may include identification information of an interference station and reception power information of a frame transmitted from the interference station. In addition, the non-interference station list may include identification information of a non-interference station and reception power information of a frame transmitted from the non-interference station.

When the identification information of the second station STA2 is included in the interference station list, the third station STA3 may determine the second station STA2 as the interference station. In this case, the third station STA3 may set an NAV based on the data frame 1301, and may not transmit the corresponding frame to other communication objects during a period indicated by the set NAV.

On the other hand, when the identification information of the second station STA2 is included in the non-interference station list, the third station STA3 may determine the second station STA2 as the non-interference station. The third station STA3 may retrieve a channel during a preset time (SIFS) from the reception termination time of the data frame 1301, and determine presence/absence of a signal exceeding a preset size through channel retrieval. Here, the preset time (SIFS) may be a DIFS, PIFS, or AIFS. In addition, the preset time (SIFS) may be less than an available channel idle period, and the available channel idle period may be a period from the reception termination time of the data frame 1301 to a reception start time of the data frame 1303.

Specifically, the third station STA3 may acquire, from the non-interference station list, reception power information in the third station STA3 with respect to a frame (for example, an ACK frame that is a response to the data frame) transmitted by the second station STA2. The third station STA3 may retrieve a corresponding channel during preset time (SIFS) based on the acquired reception power information. That is, the third station STA3 may adjust a preset signal size based on the reception power information acquired from the non-interference station list in order to remove the effect of the ACK frame 1302 transmitted from the second station STA2 when retrieving the channel. For example, the third station STA3 may set a difference between the preset signal size and reception power indicated by the reception power information as a new preset signal size, and determine whether a signal exceeding the new preset signal size is detected through channel retrieval.

When the channel is in an idle state (that is, when the signal exceeding the new preset signal size is not detected) during the preset time (SIFS), the third station STA3 may be operated as follows in accordance with presence/absence of data to be transmitted to other communication objects.

Case in which Data to be Transmitted to Other Communication Objects Exists

When having data to be transmitted to the fourth station STA4, the third station STA3 may transmit an RTS frame 1305 to the fourth station STA4 after the preset time (SIFS) from the reception termination time of the data frame 1301. In this instance, the third station STA3 may transmit the RTS frame 1305 to the fourth station STA4 after contention window (CW) according to a random back-off procedure.

When normally receiving the RTS frame 1305, the fourth station STA4 may transmit a CTS frame 1306 that is a response to the RTS frame 1305 to the third station STA3. In this instance, the fourth station STA4 may transmit the CTS frame 1306 after the SIFS from the reception termination time of the RTS frame 1305.

When normally receiving the CTS frame 1306, the third station STA3 may transmit a data frame 1307 to the fourth station STA4 after the SIFS from the reception termination time of the CTS frame 1306. When normally receiving the data frame 1307, the fourth station STA 4 may transmit an ACK frame 1308 as a response to the data frame 1307 to the third station STA3. In this instance, the fourth station STA4 may transmit the ACK frame 1308 after the SIFS from the reception termination time of the data frame 1307. When receiving the ACK frame 1308, the third station STA3 may determine that the data frame 1307 is normally received in the fourth station STA4.

Here, transmission and reception of the RTS frame 1305, the CTS frame 1306, the data frame 1307, and the ACK frame 1308 may be performed from the reception termination time of the data frame 1301 to the reception start time of the ACK frame 1304.

Case in which Data to be Transmitted to Other Communication Objects does not Exist The third station STA3 may transmit a PTS frame 1309 after a preset time (SIFS) from the reception termination time of the data frame 1301. The PTS frame 1309 may refer to a frame prevented from being transmitted to the third station STA3. The PTS frame 1309 may include at least one of a transmitter address (that is, address of the third station STA3), period information during which transmission of the frame is stopped, and a receiver address. The PTS frame 1309 may be transmitted in a broadcast method, a multicast method, or a unicast method.

Meanwhile, the fourth station STA4 may receive the PTS frame 1309 from the third station STA3. The fourth station STA4 may acquire a transmitter address from the PTS frame 1309, and may not transmit the corresponding frame to the third station STA3 indicated by the transmitter address. In addition, the fourth station STA4 may further acquire, from the PTS frame 1309, period information during which transmission of the frame is stopped, and in this case, may not transmit the corresponding frame to the third station STA3 indicated by the transmitter address for the period during which transmission of the frame is stopped. The period information during which transmission of the frame is stopped may indicate a period from the reception termination time of the PTS frame 1309 to the reception start time of the ACK frame 1304.

Figure 16:
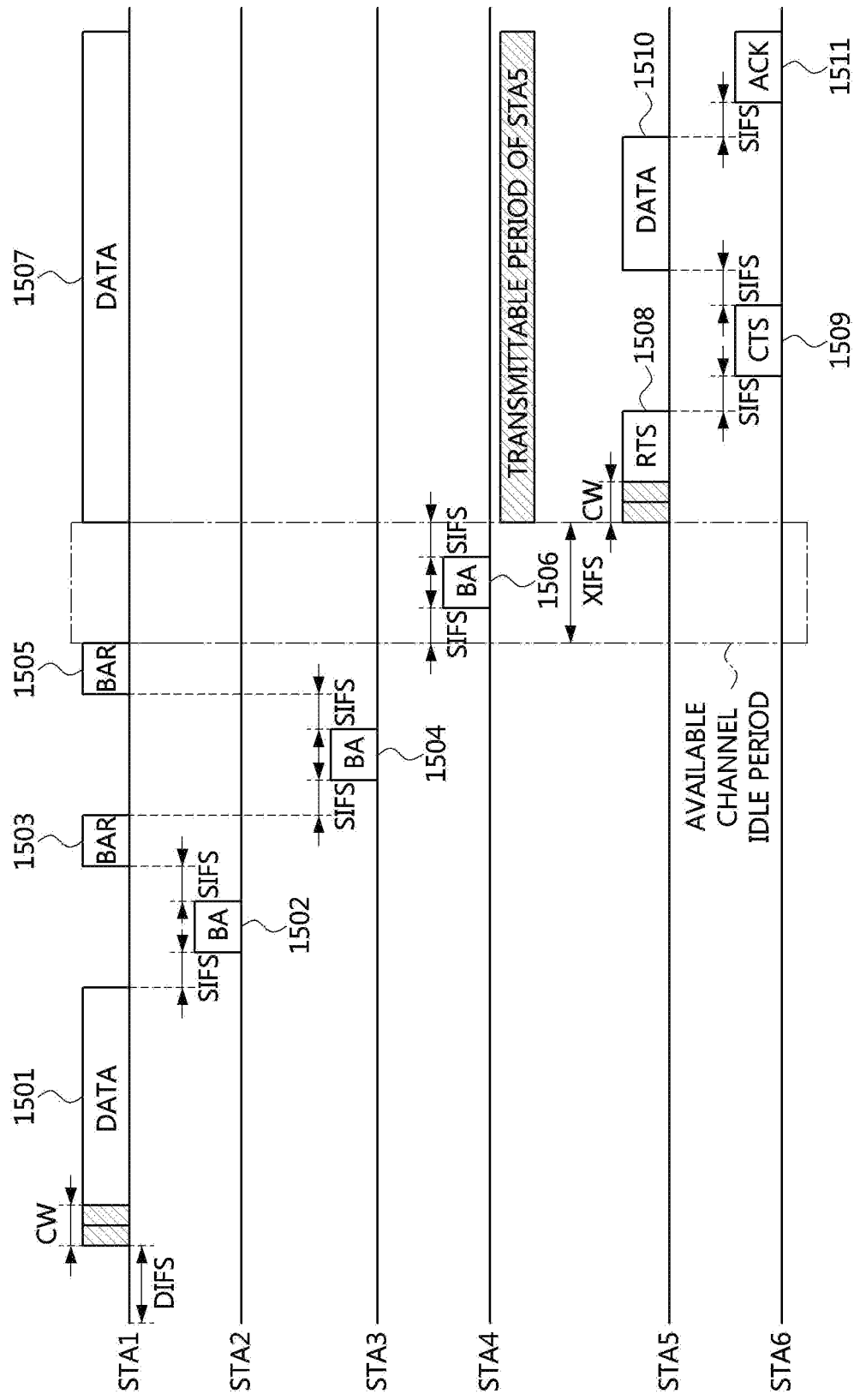
FIG. 16 is a conceptual diagram illustrating still another example of a method for transmitting a data frame according to an embodiment of the present invention.
Figure 17:
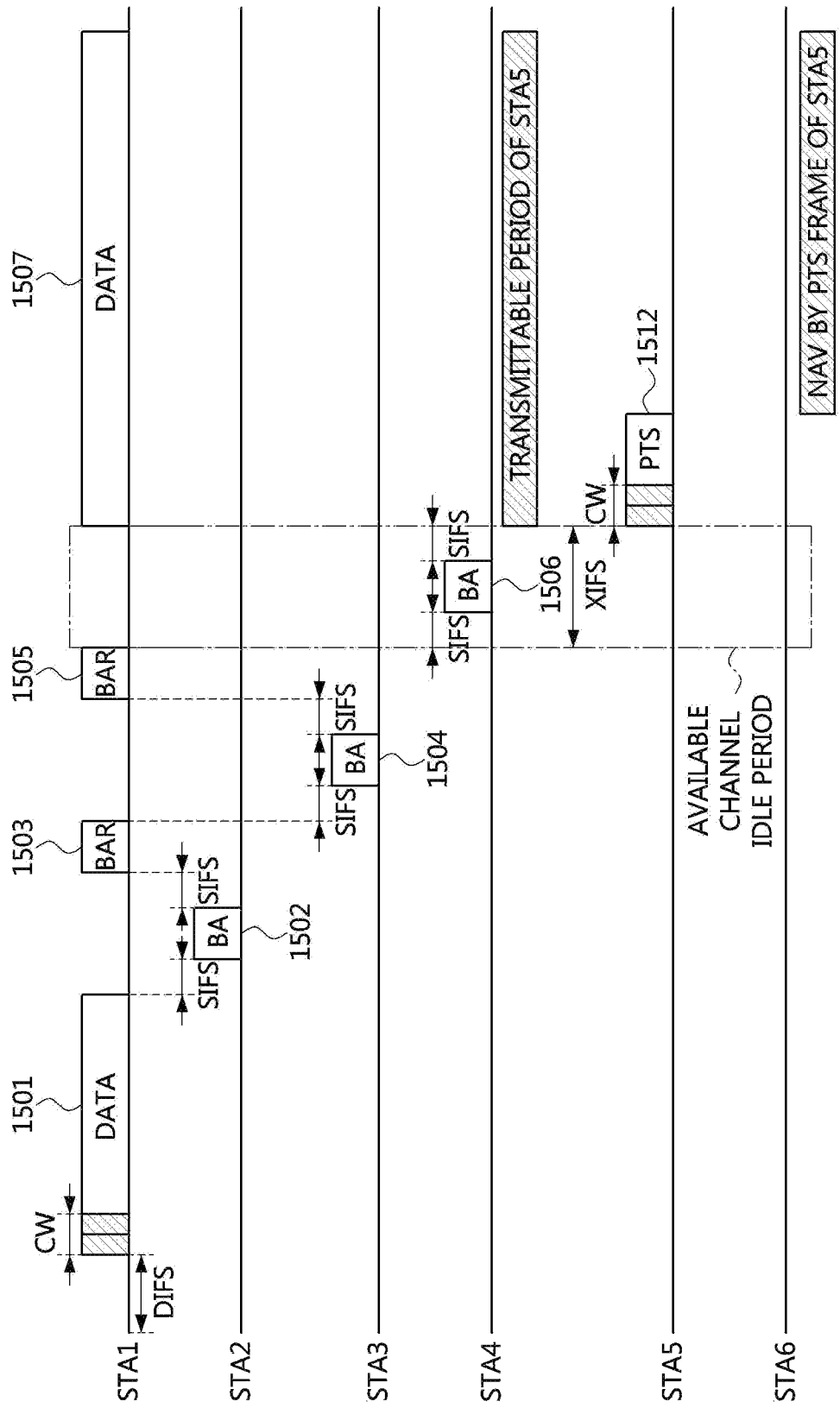
FIG. 17 is a conceptual diagram illustrating still another embodiment of a method for transmitting a PTS frame according to an embodiment of the present invention.

FIG. 16 is a conceptual diagram illustrating still another example of a method for transmitting a data frame according to an embodiment of the present invention, and FIG. 17 is a conceptual diagram illustrating still another embodiment of a method for transmitting a PTS frame according to an embodiment of the present invention.

Referring to FIGS. 16 and 17, a first station STA1, a second station STA2, a third station STA3, and a fourth station STA4 may constitute a first infrastructure BSS. A fifth station STA5 and a sixth station STA6 may constitute a second infrastructure BSS. The first station STA1 may normally receive frames transmitted from the second station STA2, the third station STA3, the fourth station STA4, and the fifth station STA5, but may not normally receive a frame transmitted from the sixth station STA6.

The fifth station STA5 may normally receive the frames transmitted from the first station STA1, the second station STA2, the third station STA3, and the sixth station STA6, but may not receive the frame transmitted from the fourth station STA4. The sixth station STA6 may normally receive the frame transmitted from the fifth station STA5, but may not normally receive the frames transmitted from the first station STA1, the second station STA2, the third station STA3, and the fourth station STA4.

That is, the first station STA1, the second station STA2, and the third station STA3 may refer to an interference station with respect to the fifth station STA5. The fourth station STA4 may refer to a non-interference station with respect to the fifth station STA5. Here, each of the stations STA1, STA2, STA3, STA4, STA5, and STA6 may refer to an AP or a terminal.

First, the first station STA1 may retrieve a channel during DIFS, and when a signal exceeding a preset signal size is not detected based on the retrieval result (that is, when the channel is in an idle state), transmit a data frame 1501 to the second station STA2, the third station STA3, and the fourth station STA4 in a multicast method after contention window (CW) according to a random back-off procedure. Here, an ACK policy of the second station STA2 may be an implicit BA, and ACK policies of the third station STA3 and the fourth station STA4 may be an explicit BA.

When receiving the data frame 1501, the second station STA2 may transmit a BA frame 1502 that is a response to the received data frame 1501 to the first station STA1. When receiving the BA frame 1502, the first station STA1 may transmit a BAR frame 1503 to the third station STA3 after an SIFS from a reception termination time of the BA frame 1502. When receiving the BAR frame 1503, the third station STA3 may transmit a BA frame 1504 that is a response to the data frame 1501 to the first station STA1. When receiving the BA frame 1504, the first station STA1 may transmit a BAR frame 1505 to the fourth station STA4 after the SIFS from the reception termination time of the BA frame 1504. When receiving the BAR frame 1505, the fourth station STA4 may transmit a BA frame 1506 that is a response to the data frame 1501 to the first station STA1. When receiving the BA frame 1506, the first station STA1 may transmit a data frame 1507 to the second station STA2, to the third station STA3, and the fourth station STA4 in the multicast method after the SIFS from the reception termination time of the BA frame 1506.

Meanwhile, the fifth station STA5 may receive the data frame 1501 transmitted from the first station STA 1. The fifth station STA5 may acquire a receiver address of the data frame 1501 from the data frame 1501 and determine that the receiver address is the second station STA2, the third station STA3, and the fourth station STA4.

The fifth station STA5 may determine whether each of the second station STA2, the third station STA3, and the fourth station STA4 is an interference station or a non-interference station based on an interference station list and a non-interference station list which are generated in advance.

Here, the second station STA2 and the third station STA3 are assumed to be the interference station, and the fourth station STA4 is assumed to be the non-interference station.

The interference station list and the non-interference station list may be the same as the interference station list and the non-interference station list described with reference to FIG. 10. That is, the interference station list may include identification information of an interference station and reception power information of a frame transmitted from the interference station. In addition, the non-interference station list may include identification information of a non-interference station and reception power information of a frame transmitted from the non-interference station.

When the identification information of the second station STA2 is included in the interference station list, the fifth station STA5 may determine the second station STA2 as the interference station. Thus, the fifth station STA5 may not attempt to transmit the corresponding frame while the second station STA2 transmits the BA frame 1502.

When identification information of the third station STA3 is included in the interference station list, the fifth station STA5 may determine the third station STA3 as the interference station. Thus, the fifth station STA5 may not attempt to transmit the corresponding frame while the third station STA3 transmits the BA frame 1504.

When identification information of the fourth station STA4 is included in the non-interference station list, the fifth station STA5 may determine the fourth station STA4 as the non-interference station. The fifth station STA5 may retrieve a channel during a preset time (SIFS) from the reception termination time of the BAR frame 1505, and determine presence/absence of a signal exceeding a preset size through channel retrieval. Here, the preset time (SIFS) may be a DIFS, PIFS, or AIFS. In addition, the preset time (SIFS) may be less than an available channel idle period, and the available channel idle period may be a period from the reception termination time of the BAR frame 1505 to a reception start time of the data frame 1507.

Specifically, the fifth station STA5 may acquire, from the non-interference station list, reception power information in the fifth station STA5 with respect to a frame (for example, a BA frame that is a response to the data frame) transmitted by the fourth station STA4. The fifth station STA5 may retrieve a corresponding channel during the preset time (SIFS) based on the acquired reception power information. That is, the fifth station STA5 may adjust a preset signal size based on the reception power information acquired from the non-interference station list in order to remove the effect of the BA frame 1506 transmitted from the fourth station STA4 when retrieving the channel. For example, the fifth station STA5 may set a difference between the preset signal size and reception power indicated by the reception power information as a new preset signal size, and determine whether a signal exceeding the new preset signal size is detected through channel retrieval.

When the channel is in an idle state (that is, when the signal exceeding the new preset signal size is not detected) during the preset time (SIFS), the fifth station STA5 may be operated as follows in accordance with presence/absence of data to be transmitted to other communication objects.

Case in which Data to be Transmitted to Other Communication Objects Exists

When having data to be transmitted to the sixth station STA6, the fifth station STA5 may transmit an RTS frame 1508 to the sixth station STA6 after the preset time (SIFS) from the reception termination time of the BAR frame 1505. In this instance, the fifth station STA5 may transmit the RTS frame 1508 to the sixth station STA6 after contention window (CW) according to a random back-off procedure.

When normally receiving the RTS frame 1508, the sixth station STA6 may transmit a CTS frame 1509 that is a response to the RTS frame 1508 to the fifth station STA5. In this instance, the sixth station STA6 may transmit the CTS frame 1509 after the SIFS from the reception termination time of the RTS frame 1508.

When normally receiving the CTS frame 1509, the fifth station STA5 may transmit a data frame 1510 to the sixth station STA6 after the SIFS from the reception termination time of the CTS frame 1509. When normally receiving the data frame 1510, the sixth station STA 6 may transmit an ACK frame 1511 as a response to the data frame 1510 to the fifth station STA5. In this instance, the sixth station STA6 may transmit the ACK frame 1511 after the SIFS from the reception termination time of the data frame 1510.

Here, transmission and reception of the RTS frame 1508, the CTS frame 1509, the data frame 1510, and the ACK frame 1511 may be performed from the reception termination time of the BAR frame 1505 to a reception start time of the response to the data frame 1507.

Case in which Data to be Transmitted to Other Communication Objects does not Exist The fifth station STA5 may transmit a PTS frame 1512 after a preset time (SIFS) from the reception termination time of the BAR frame 1505. The PTS frame 1512 may refer to a frame prevented from being transmitted to the fifth station STA5. The PTS frame 1512 may include at least one of a transmitter address (that is, address of the fifth station STA5), period information during which transmission of the frame is stopped, and a receiver address. The PTS frame 1512 may be transmitted in a broadcast method, a multicast method, or a unicast method.

Meanwhile, the sixth station STA6 may receive the PTS frame 1512 from the fifth station STA5. The sixth station STA6 may acquire a transmitter address from the PTS frame 1512, and may not transmit the corresponding frame to the fifth station STA5 indicated by the transmitter address. In addition, the sixth station STA6 may further acquire, from the PTS frame 1512, period information during which transmission of the frame is stopped, and in this case, may not transmit the corresponding frame to the fifth station STA5 indicated by the transmitter address for the period during which transmission of the frame is stopped. The period information during which transmission of the frame is stopped may indicate a period from the reception termination time of the PTS frame 1512 to the reception start time of the response to the data frame 1507.

As described above, according to the present invention, the station in the exposed node state may transmit the corresponding frame. Meanwhile, the station in the blocked node state may request transmission stop of a frame using the station itself as a destination, so that the frame using the station itself as the destination may be prevented from being transmitted. Thus, the performance of the WLAN system may be improved.

The embodiments of the present invention may be implemented in the form of program instructions that can be executed through various computer means and recorded in a computer-readable medium. The computer-readable medium may separately include program instructions, data files, data structures, etc. or include a combination of them. The program commands recorded in the computer-readable medium may be specially designed and configured for the present invention, or known and available to those of ordinary skill in the field of computer software. The computer-readable medium may mean a hardware device particularly configured to store and perform the program instructions such as a ROM, RAM, flash memory, or the like. The hardware device may be configured to be operated as at least one software module so as to perform the operations according to the embodiments of the present invention, and vice versa.

Examples of the computer-readable medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands. Examples of the program instructions may include high-level language codes executable by a computer using an interpreter, etc. as well as machine language codes made by compilers.

While the example embodiments of the present invention and their advantages have been described in detail, it should be understood that various changes, substitutions, and alterations may be made herein without departing from the scope of the invention.

What is claimed is:

1. A method for generating interference/non-interference (I/NI) station lists which is performed in a first station (STA1), the method comprising:
 receiving at the STA1 a first frame (FRM1) from a second station (STA2),
  wherein the frame type of the FRM1 comprises at least one of a probe request frame, an authentication request frame, an association request frame, a reassociation request frame, a request to send (RTS) frame, a data frame, or a block acknowledgement request (BAR) frame;
 acquiring a receiver address (RA) of the FRM1 from the FRM1;
 setting a third station (STA3) as an interference station in the I/NI station lists when the RA of the FRM1 is addressed to the STA3 and when a second frame (FRM2) is received by the STA1 within a preset time (PT) set after receipt of the FRM1 such that the RA of the FRM2 from the STA3 is addressed to the STA2,
  wherein the frame type of the FRM2 comprises at least one of a probe response frame, an authentication response frame, an association response frame, a reassociation response frame, a clear to send (CTS) frame, an acknowledgement (ACK) frame, or a block acknowledgement (BA) frame;
 setting the STA3 as a non-interference station in the I/NI station lists when the RA of the FRM1 is addressed to the STA3 and when the FRM2 is received by the STA1 outside the PT set after receipt of the FRM1; and
 transmitting a prevent to send (PTS) frame when the STA1 is in an idle state such that the PTS frame comprises at least one of a transmitter address of the STA1, information about a period during which transmission to the STA1 is to be stopped, and the RA of the PTS frame corresponds to the STA3.

2. The method of claim 1, further comprising:
 setting a network allocation vector (NAV) at the STA1 so that the STA1 does not transmit a frame during a timed duration indicated by the set NAV when the STA3 is set as the interference station.

3. The method of claim 2, wherein setting the NAV at the STA1 is based on the timed duration that corresponds to a duration field in a MAC header of the FRM2 from the STA3.

4. The method of claim 1, wherein the I/NI station lists comprises identification information of the STA3 and reception power information of the FRM2 measured by the STA1.

5. The method of claim 1, wherein the FRM1 comprises the RTS frame from the STA2 and the FRM2 comprises the CTS frame from the STA3.

6. The method of claim 1, wherein the PT is a short inter-frame space (SIFS).

7. A method for transmitting a frame which is performed by a first station (STA1), the method comprising:
 receiving at the STA1 a first frame (FRM1) from a second station (STA2),
  wherein the frame type of the FRM1 comprises at least one of a probe request frame, an authentication request frame, an association request frame, a reassociation request frame, a request to send (RTS) frame, a data frame, or a block acknowledgement request (BAR) frame;
 acquiring a receiver address (RA) of the FRM1 from the FRM1; and
 determining whether a third station (STA3) indicated by the RA of the FRM1 is an interference station or a non-interference station based on interference/non-interference (I/NI) station lists generated in advance,
  wherein the interference station list of the I/NI station lists includes at least one station that transmits a response to the FRM1 within a first preset time (PT1), and the non-interference station list of the I/NI station lists includes at least one station that transmits the response to the FRM1 outside the PT1;
 acquiring reception power information about a second frame (FRM2) transmitted by the STA3 from the I/NI station lists,
  wherein the frame type of the FRM2 comprises at least one of a probe response frame, an authentication response frame, an association response frame, a reassociation response frame, a clear to send (CTS) frame, an acknowledgement (ACK) frame, or a block acknowledgement (BA) frame,
 retrieving a channel based on the reception power information during a second preset time (PT2), and
 transmitting a third frame (FRM3) after the PT2 when a signal exceeding a preset signal size does not exist during the PT2 and after the PT2 from a time when the FRM1 has been received when the STA3 is determined as the non-interference station,
  wherein the frame type of the FRM3 comprises at least one of a probe request frame, an authentication request frame, an association request frame, a reassociation request frame, a RTS frame, a data frame, or a BAR frame.

8. The method of claim 7, wherein the FRM1 comprises at least one of the RTS frame, the data frame, or the BAR frame.

9. The method of claim 7, further comprising:
 setting a network allocation vector (NAV) at the STA1 so that the STA1 does not transmit a frame during a timed duration indicated by the set NAV when the STA3 is set as the interference station.

10. The method of claim 7, wherein the the PT1 is short inter-frame space (SIFS).

11. The method of claim 9, wherein setting the NAV at the STA1 is based on the timed duration that corresponds to a duration field in a MAC header of the FRM2 from the STA3.

12. The method of claim 7, wherein the PT2 is short inter-frame space (SIFS).

13. The method of claim 7, wherein the PT2 comprises at least one of a distributed coordination function (DCF) inter-frame space (DIFS), a point coordination function (PCF) inter-frame space (PIFS), or an arbitration inter-frame space (AIFS).

14. The method of claim 7, wherein the FRM3 comprises a prevent to send (PTS) frame.

15. The method of claim 14, wherein the PTS frame comprises at least one of a transmitter address of the STA1, information about a period during which transmission to the STA1 is to be stopped, and the RA of the PTS frame corresponds to the STA3.

16. A first station (STA1) comprising:
 a processor; and
 a memory in which at least one program command executed through the processor is stored, wherein the at least one program command is executable to perform steps of:

receiving at the STA1 a first frame (FRM1) from a second station (STA2),
  wherein the frame type of the FRM1 comprises at least one of a probe request frame, an authentication request frame, an association request frame, a reassociation request frame, a request to send (RTS) frame, a data frame, or a block acknowledgement request (BAR) frame;

acquiring a receiver address (RA) of the FRM1 from the FRM1; and determining whether a third station (STA3) indicated by the RA of the FRM1 is an interference station or a non-interference station based on interference/non-interference (I/NI) station lists generated in advance, wherein the interference station list of the I/NI station lists includes at least one station that transmits a response to the FRM1 within a first preset time (PT1), and the non-interference station list of the I/NI station lists includes at least one station that transmits the response to the FRM1 outside the PT1;

acquiring reception power information about a second frame (FRM2) transmitted by the STA3 from the I/NI station lists,
  wherein the frame type of the FRM2 comprises at least one of a probe response frame, an authentication response frame, an association response frame, a reassociation response frame, a clear to send (CTS) frame, an acknowledgement (ACK) frame, or a block acknowledgement (BA) frame, retrieving a channel based on the reception power information during a second preset time (PT2), and transmitting the a third frame (FRM3) after the PT2 when a signal exceeding a preset signal size does not exist during the PT2 and after the PT2 from a time when the FRM1 has been received when the STA3 is determined as the non-interference station,
  wherein the frame type of the FRM3 comprises at least one of a probe request frame, an authentication request frame, an association request frame, a reassociation request frame, a RTS frame, a data frame, or a BAR frame.

17. The STA1 of claim 16, wherein the interference station list of the I/NI station lists includes at least one station that transmits a response to the FRM1 within the PT1, and the non-interference station list of the I/NI station lists includes at least one station that fails to transmit the response to the FRM1 within the PT1.

18. The STA1 of claim 16, wherein the at least one program command is executable to further perform a step of setting a network allocation vector (NAV) at the STA1 so that the STA1 does not transmit a frame during a timed duration indicated by the set NAV when the STA3 is set as the interference station.

19. The STA1 of claim 18, wherein setting the NAV at the STA1 is based on the timed duration that corresponds to a duration field in a MAC header of the FRM2 from the STA3.

20. The STA1 of claim 16, wherein the FRM3 comprises a prevent to send (PTS) frame that requests stopping frame transmission to the STA1.

* * * * *